(12) United States Patent
Zacherle et al.

(10) Patent No.: US 12,494,290 B2
(45) Date of Patent: Dec. 9, 2025

(54) NOISE MEASURE FOR COPY NUMBER ANALYSIS ON TARGETED PANEL SEQUENCING DATA

(71) Applicant: Siemens Healthcare GmbH, Erlangen (DE)

(72) Inventors: Tobias Zacherle, Cologne (DE); Johannes Heuckmann, Kerpen (DE)

(73) Assignee: Siemens Healthineers AG, Erlangen (DE)

( * ) Notice: Subject to any disclaimer, the term of this patent is extended or adjusted under 35 U.S.C. 154(b) by 1171 days.

(21) Appl. No.: 17/279,900

(22) PCT Filed: Sep. 16, 2019

(86) PCT No.: PCT/EP2019/074654
§ 371 (c)(1),
(2) Date: Mar. 25, 2021

(87) PCT Pub. No.: WO2020/064390
PCT Pub. Date: Apr. 2, 2020

(65) Prior Publication Data
US 2022/0036972 A1    Feb. 3, 2022

(30) Foreign Application Priority Data
Sep. 28, 2018 (GB) ..................................... 1815851

(51) Int. Cl.
*G16H 50/30* (2018.01)
*G16B 20/10* (2019.01)
*G16B 30/20* (2019.01)
*G16H 20/10* (2018.01)

(52) U.S. Cl.
CPC ............. *G16H 50/30* (2018.01); *G16B 20/10* (2019.02); *G16B 30/20* (2019.02); *G16H 20/10* (2018.01)

(58) Field of Classification Search
CPC ........ G16H 50/30; G16H 20/10; G16B 20/10; G16B 30/20; G16B 30/00; G16B 40/00; C12Q 1/6869; C12Q 1/6886; C12Q 1/6883; C12Q 2600/118
See application file for complete search history.

(56) References Cited

U.S. PATENT DOCUMENTS

| | | | |
|---|---|---|---|
| 2008/0120038 A1 | 5/2008 | Ghosh et al. | |
| 2011/0230362 A1 | 9/2011 | Brown et al. | |
| 2017/0260590 A1 | 9/2017 | Eltoukhy et al. | |
| 2017/0362638 A1 | 12/2017 | Chudova et al. | |
| 2018/0032671 A1* | 2/2018 | Mazloom | G16B 40/00 |

FOREIGN PATENT DOCUMENTS

| | | |
|---|---|---|
| WO | 2008016374 A2 | 2/2008 |
| WO | 2015061359 A1 | 4/2015 |
| WO | 2016094853 A1 | 6/2016 |

OTHER PUBLICATIONS

Liu J, Liu J-X, Gao Y-L, Kong X-Z, Wang XS, Wang D. A P-Norm Robust Feature Extraction Method for Identifying Differentially Expressed Genes. PLoS ONE 10(7): e0133124. (Year: 2015).*
Taylor BS. Functional copy—number alterations in cancer. Plos One 3(9):e317, 16 pages. (Year: 2008).*
Albertson et al., Gene amplification in cancer, Trends in Genetics, 2006, 22 (8): pp. 447-455.
Bellos et al, "cnvOffSeq: detecting intergenic copy number variation using off-target exome sequencing data", Bioinformatics, vol. 30, 2014, pp. i639-i645, doi:10.1093/bioinformatics/btu475.
Benjamini et al., Summarizing and correcting the GC content bias in high throughput sequencing, Nucleic Acids Research, 2012, vol. 40, No. 10, doi:10.1093/nar/gks001.
Bullinger et al., Genomics of acute myeloid leukemia diagnosis and pathways, Journal of Clinical Oncology, Mar. 20, 2017, 35 (9): 934-946.
Carter et al., Absolute quantification of somatic DNA alterations in human cancer, Nat Biotechnol, 2012, 30 (5): 413-421.
Efron and Tibshirani, Bootstrap Methods for Standard Errors, Confidence Intervals, and Other Measures of Statistical Accuracy, Statistical Science, 1986, vol. 1, No. 1, pp. 54-75.
Frampton et al., Development and validation of a clinical cancer genomic profiling test based on massively parallel DNA sequencing, Nature Biotechnology, 2013, 31 (11), pp. 1023-1031.
Gnirke et al., Solution Hybrid Selection with Ultra-long Oligonucleotides for Massively Parallel Targeted Sequencing, Nature Biotechnology, 2009, 27 (2), pp. 182-189.
Goodwin et al., Coming of age: ten years of next-generation sequencing technologies, Nature Reviews Genetics, 2016, 17, pp. 333-351.
Herbst et al., Molecular Origins of Cancer, Lung Cancer, The New England Journal of Medicine, 2008, 359:1367-1380.
Jabs et al., Integrati e analysis of genome-wide gene copy number changes and gene expression in non-small cell lung cancer, PLoS ONE, Nov. 7, 2017, 12 (11): e0187246.
Klambauer et al., "cn.MOPS: mixture of Poissons for discovering copy number variations in next-generation sequencing data with a low false discovery rate", Nucleic Acids Research, 2012, vol. 40, No. 9, doi:10.1093/nar/gks003.
Koboldt et al., VarScan 2: somatic mutation and copy number alteration discovery in cancer by exome sequencing, Genome Research, 2012, 22 (3): 568-576.

(Continued)

*Primary Examiner* — Olivia M. Wise
*Assistant Examiner* — Robert J. Kallal
(74) *Attorney, Agent, or Firm* — BakerHostetler

(57) ABSTRACT

The present invention relates to a method for determining the statistical noise level in the calculation of a subject's genetic copy number value in massively parallel nucleic acid sequencing data derived from a sample, as well as a method for determining a subject's genetic copy number value in massively parallel nucleic acid sequencing data derived from a sample and a method to determine a subject's genetic copy number value for stratifying the subject for cancer therapy.

6 Claims, 8 Drawing Sheets

(56) References Cited

OTHER PUBLICATIONS

Kong et al.: ExCNVSS: A Noise-Robust Method for Copy Number Variation Detection in Whole Exome Sequencing Data, 2017, BioMed Research International vol. 2017, Article ID 9631282, 11 pages, ps://doi.org/10.1155/2017/9631282.

Li et al., Fast and accurate short read slignment with Burrows-Wheeler transform, Bioinformatics, 2009, 25, pp. 1754-1760.

Mertes et al., Targeted enrichment of genomic DNA regions for next-generation sequencing, Brief in Functional Genomics, 2011, 10 (6), pp. 374-386.

Olshen et al.: Circular binary segmentation for the analysis of array-based DNA copy number data, Biostatistics, 2004, 5, 4, pp. 557-572, doi: 10.1093/biostatistics/kxh008.

Riester et al., PureCN: Copy number calling and SNV classification using targeted short read sequencing, Source Code Biology and Medicine, 2016, 11:13.

Romond et al., Trastuzumab plus adjuvant chemotherapy for operable HER2-Positive breast cancer, The New England Journal of Medicine, Oct. 20, 2005, 353 (16): pp. 1673-1684.

Talevich et al., CNVkit: Genome-wide copy number detection and visualization from targeted DNA Sequencing, PLoS Computational Biology, Apr. 2016, 12 (4): e1004873.

Teer et al., Systematic comparison of three genomic enrichment methods for massively parallel DNA sequencing, Genome Research, 2010, 20 (10), pp. 1420-1431.

Van Dijk et al., Ten years of nex-generation sequencing technology, Trends in Genetics, 2014, 9, pp. 418-426.

Zare et al., Preprocessing Sequence Coverage Data For More Precise Detection Of Copy Number Variations; pp. 1-10, IEEE/ACM Transactions On Computational Biology And Bioinformatics, 2018, pp. 1-10.

Zare et al., An evaluation of copy number variation detection tools for cancer using whole exome sequencing data, BMC Bioinformatics, 2017, 18:286, pp. 1-13.

* cited by examiner

FIG 1

| gene | # partitions | Mean CN | Standard error CN (SE) | SE/mean CN | Standard deviation partition copy numbers (SD) | SD/mean CN |
|---|---|---|---|---|---|---|
| ALK | 20 | 2.1 | 0.1 | 0.048 | 0.447 | 0.213 |
| EGFR | 50 | 5.3 | 0.1 | 0.019 | 0.707 | 0.133 |
| HRAS | 4 | 1.2 | 0.2 | 0.167 | 0.400 | 0.333 |
| MET | 30 | 2.3 | 0.12 | 0.052 | 0.657 | 0.286 |
| PDGFRA | 35 | 1.9 | 0.07 | 0.037 | 0.414 | 0.218 |

$$\Sigma = 0.323 \qquad \Sigma = 1.186$$

$$MRSE = \frac{0.323}{5} = 0.0646 \qquad MCV = \frac{1.183}{5} = 0.2366$$

-> small SD, SE

-> larger SD, SE

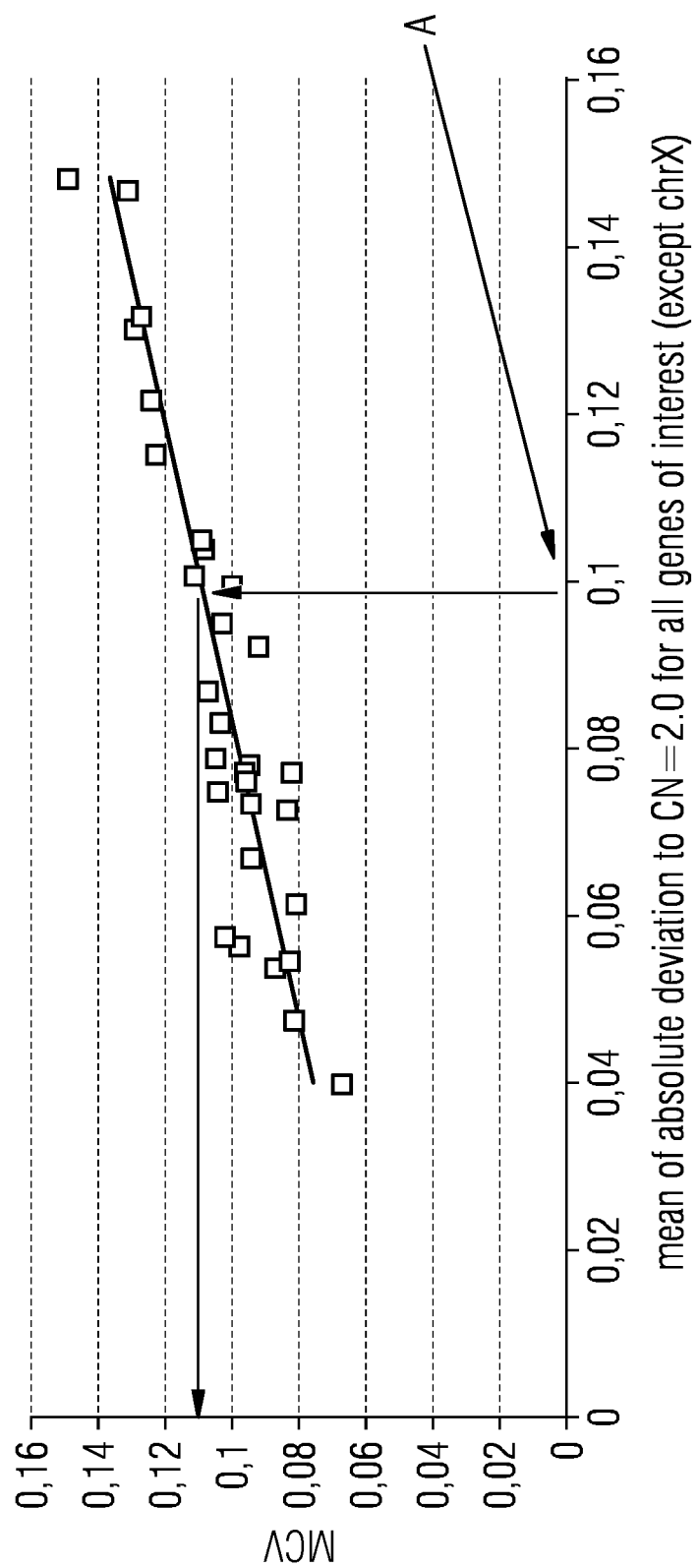

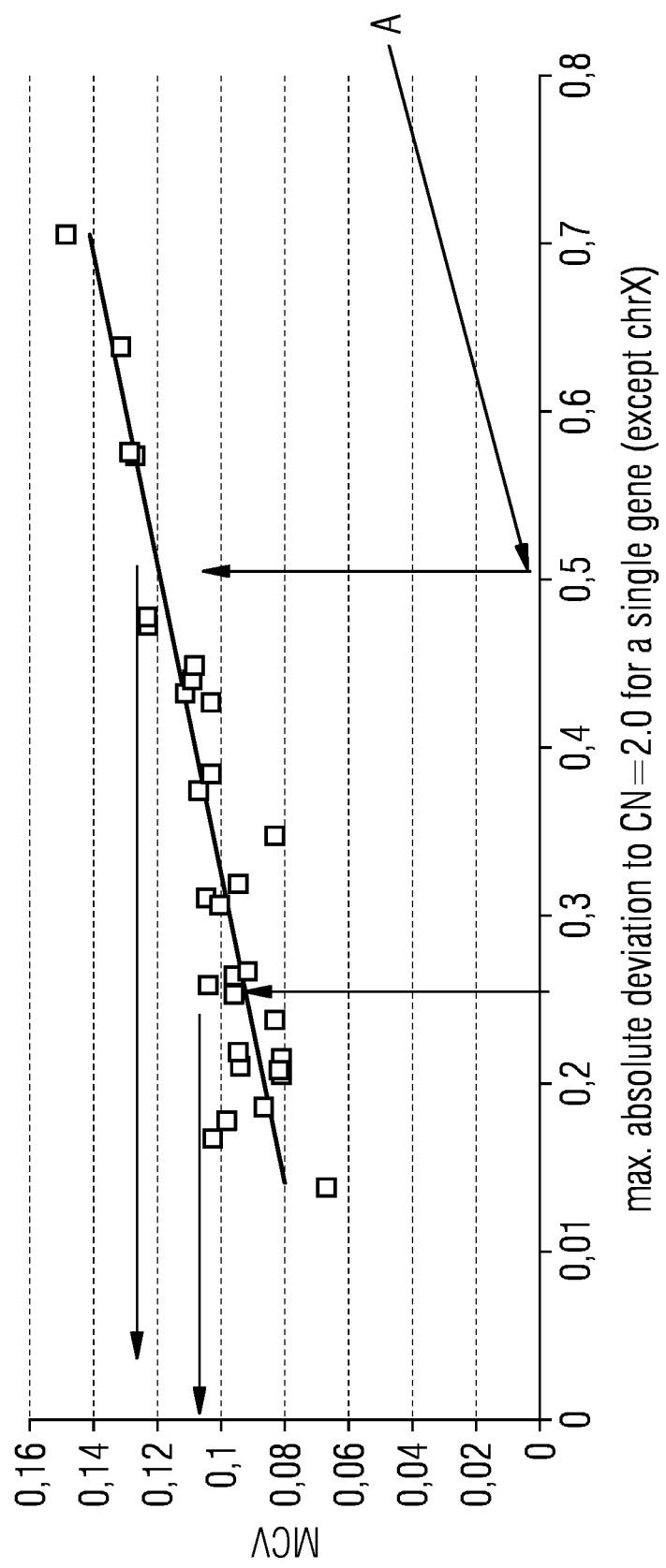

NOISE MEASURE FOR COPY NUMBER ANALYSIS ON TARGETED PANEL SEQUENCING DATA

CROSS-REFERENCE TO RELATED APPLICATIONS

This application is a 35 U.S.C. § 371 national phase application of International Patent Application No. PCT/EP2019/074654, filed Sep. 16, 2019, which claims priority to Great Britain Application No. 1815851.9, filed Sep. 28, 2018, the entire disclosure of each of which is incorporated herein by reference in its entirety.

TECHNICAL FIELD

The present invention relates to a method for determining the statistical noise level in the calculation of a subject's genetic copy number value in massively parallel nucleic acid sequencing data derived from a sample, as well as a method for determining a subject's genetic copy number value in massively parallel nucleic acid sequencing data derived from a sample and a method to determine a subject's genetic copy number value for stratifying the subject for cancer therapy.

BACKGROUND

Copy Number analysis is a crucial part of genomic analysis and can provide major indications for a certain line of treatment in targeted cancer therapy (Albertson et al., 2006 Trends in Genetics, 22(8):447-55; Romond et al., 2005, The New England Journal of Medicine, 353(16):1673-84; or Bullinger et al., 2017, Journal of Clinical Oncology, 35(9):934-946). Some standard procedures have evolved over time, in particular array CGH (Comparative Genomic Hybridization) and LC-WGS (Low Coverage Whole Genome Sequencing: NGS setting). The usual analysis is by matched normal analysis, i.e. analyzing tumor and normal sample in parallel both in library-preparation and sequencing. Then the resulting copy numbers are obtained by segmenting relative signal- or read-ratios of tumor and normal into regions of equal ratios (i.e. copy number; Koboldt et al., 2012, Genome Research, 22(3):568-76).

However, for targeted (small) panel sequencing in a routine diagnostic NGS setting, copy number analysis still proves to be a challenging task with many inherent problems such as small overall covered genomic regions, an inability to use segmentation algorithms due to large gaps between small covered regions, the fact that a matched normal analysis is usually not performed due to cost or non-availability of matched-normal tissue. Furthermore, small differences in lab procedures are expected to have in general a higher impact on highly amplified libraries (high coverage), than for low coverage libraries, etc. In addition to those technical challenges of panel sequencing, the great variability of DNA quality as well as the wide range of copy number alterations in tumors and the occurrence of non-diploid tumor genomes make robust copy number calling challenging.

For these reasons there can be considerable noise present in the copy number data derived from targeted panel sequencing approaches or even from whole exon sequencing projects. This can result in false positive and false negative copy number calls. Many of these may remain unnoticed due to the lack of robust indicators for noisiness of the data or of individual copy number calls.

There is hence a need for a robust and reliable method to measure noise for copy number data derived from targeted panel sequencing.

SUMMARY

The present invention addresses this need and presents a method for determining the statistical noise level in the calculation of a subject's genetic copy number value in massively parallel nucleic acid sequencing data derived from a sample, comprising: (a) obtaining massively parallel sequencing information of a subject's sample and of a cohort of normal sample for a defined set of genomic loci as nucleic acid sequence reads; (b) aligning said nucleic acid sequencing reads to a reference sequence; (c) determining copy number values using a median normalized ratio of sample read count data and normal read count data as obtained in step (a); (d) determining the ratio of a standard error value or a standard deviation value to a copy number value as determined in step (c) at each locus of said defined set of genomic loci; (e) adding the ratios as determined in step (d), optionally multiplying each ratio with a weight factor corresponding to the clinical relevance of the locus; (f) obtaining a value for the statistical noise level in a subject's genetic copy number wherein said value for the statistical noise level is the sum of added ratios as obtained in step (e); and (g) normalizing the value obtained in step (f) by the size of the defined set of genomic loci or by the sum of all applied weights for the defined set of genomic loci if different weights are applied.

The provided method advantageously allows to obtain a statistically sound value for a noise level for copy number calling. This approach further helps to reduce false positive and false negative calls in copy number analysis, which is an essential focus for any comprehensive diagnostic test. In addition by using the noise measure calculated according to the herein described methodology for noise reduction, it becomes possible to reliably call copy numbers in more samples and at lower amplitudes, which is an additional benefit for the customer and the company. The present invention thus aims at the improvement of copy number determination in sequencing data and solves this specific technical problem within a diagnostic framework, allowing for significantly enhanced therapeutic treatment decisions. For example, the approach allows for an improved stratification of a patient for cancer therapy and a more reliable computation of the subject's genetic copy number due to noise reduction in the data.

In one embodiment, the copy number value as determined in step (c) of the method depicted above is determined on the basis of mean values, optionally on the basis of median values or trimmed mean values.

In a further embodiment of the present invention said set of genomic loci comprise(s) one or more of the following: (an) exonic sequence(s), (an) intronic sequence(s), and (a) gene region(s), preferably (a) gene region(s).

According to another embodiment the set of genomic loci comprise a preselected panel of genes, preferably a panel of genes associated with a disease or with the development of a disease, more preferably a panel of genes associated with cancer or the development of cancer.

In another embodiment of the present invention the panel of genes is a panel of at least 10 genes. It is preferred that the panel is a panel of at least 30 genes. In a more preferred embodiment it is a panel of at least 100 genes. Also envisaged are panels of 300 genes and more.

In a further aspect the present invention relates to a method of reducing the statistical noise level in the calculation of a subject's genetic copy number value in massively parallel nucleic acid sequencing data derived from a sample, comprising carrying out the method for determining the statistical noise level in the calculation of a subject's genetic copy number value as defined herein, wherein said normal sample is selected from a heterogeneous cohort of normal samples, wherein normal sample yields the lowest final noise measure among all normal samples of said cohort with respect to the subject's sample analyzed, or wherein said normal sample is a sub-cohort selected from a heterogeneous cohort of normal samples, wherein said sub-cohort comprises those normal samples which yield the 2, 3, 4 or 5 lowest final noise measures among all normal samples of said cohort with respect to the subject's sample analyzed, and wherein a reduced value for the statistical noise level in a subject's genetic copy number is obtained.

According to a specific embodiment of the method of reducing the statistical noise level, the heterogeneous cohort of normal samples comprises samples with coverage levels ranging from at least about 50× to at most about 10000×.

According to a central embodiment of the present invention, a value obtained for the statistical noise level in a subject's genetic copy number is considered to indicate a noisy sample if a threshold is surpassed, which threshold is calculated according to a procedure comprising the steps of: (a) selecting a set of normal samples as a calibration test set, wherein all copy numbers are known to have a value of 2; (b) selecting a disjunct set of calibration normal samples as a reference set, wherein all copy numbers are known to have a value of 2; (c) analyzing each normal sample in the calibration test set to determine the copy number value of all loci of said defined set of genomic loci, the copy number standard deviation and the copy number standard error by using the calibration reference set of normal samples of step for normalization; (d) calculating the noise measure value for each of the calibration test samples, wherein the calculation is performed as defined in steps (d) to (g) of the method as outlined herein above; (e) calculating a direct noise measure value of the copy number value of step (c) by forming a column vector of deviations to a copy number value 2, wherein each component of the vector is the deviation of the copy number value of a single locus as determined in step from the copy number value 2; (f) calculating the p-norm of the vector obtained in step (e) for values of p=1 and/or p→∞ (maximum norm); (g) for the case of p=1 said p-norm value is normalized by the size of the defined set of genomic loci to obtain a mean of absolute deviations to copy number 2 for all genetic copy numbers in said defined set of genomic loci; (h) plotting the noise measure of each test sample against the so obtained mean absolute deviation to copy number 2 or maximum deviation to copy number 2 and observing correlations for both plots; (i) using a significance criterion for a threshold in terms of the mean absolute deviation to 2 or maximum deviation to 2 and determining to which value of noise measure it translates;
and (j) applying said threshold to the value for the statistical noise level obtained in a method as defined herein above.

In a further aspect the present invention relates to a method for determining a subject's genetic copy number value in massively parallel nucleic acid sequencing data derived from a sample, comprising adjusting the determination of the subject's genetic copy number value by applying a value for the statistical noise level in a subject's genetic copy number as determined in the method as defined herein.

In a further embodiment of said method for determining a subject's genetic copy number value said adjusting of the determination of the subject's genetic copy number value c comprises an exclusion from further usage of samples which have been identified as being higher than the respective threshold obtained according to the threshold calculation procedure described herein.

In another embodiment of said method for determining a subject's genetic copy number value said adjusting of the determination of the subject's genetic copy number value comprises a modification of the statistical significance of a calculated genetic copy number subject to the value for the statistical noise level in a subject's genetic copy number as determined in a method for determining the statistical noise level in the calculation of a subject's genetic copy number value described herein.

In a further aspect the present invention relates to a method to determine a subject's genetic copy number value for stratifying the subject for cancer therapy, comprising: (a) performing a massively parallel nucleic acid sequencing of nucleic acids extracted from a subject's tumor sample; (b) determining the subject's genetic copy number value according to the method for determining a subject's genetic copy number value as defined herein; and (c) attributing the determined subject's genetic copy number value to a group of increased, normal or decreased genetic copy number values, which can guide a treatment decision.

In an embodiment of said method a decreased genetic copy number value corresponds to a genetic copy number value significantly lower than 2, a normal genetic copy number value corresponds to a genetic copy number value of 2 and an increased copy number value corresponds to a copy number value significantly higher than 2.

In a further embodiment of said method a decreased or increased genetic copy number value indicates a preference for a targeted cancer therapy.

In yet another embodiment said method additionally comprising a preparation step for nucleic acids extracted from a subject's sample, which precedes step (a), comprising a hybrid-capture based nucleic acid enrichment for genomic loci of interest.

In a further embodiment of the method to determine a subject's genetic copy number value for stratifying the subject for cancer therapy, the sample comprises one or more premalignant or malignant cells; cells from a solid tumor or soft tissue tumor or a metastatic lesion; tissue or cells from a surgical margin; a histologically normal tissue obtained in a biopsy; one or more circulating tumor cells (CTC; cell free DNA (cfDNA); a normal, adjacent tissue (NAT) from a subject having a tumor or being at risk of having a tumor; or a blood, plasma, urine, saliva or serum sample containing nucleic acids from the tumor from the same subject having a tumor or being at risk of having a tumor; or a paraffin or FFPE-sample.

In a further embodiment, the cancer may be breast cancer, prostate cancer, ovarian cancer, renal cancer, lung cancer, pancreas cancer, urinary bladder cancer, uterus cancer, kidney cancer, brain cancer, stomach cancer, colon cancer, melanoma or fibrosarcoma, GIST, glioblastoma or hematological leukemia and lymphomas, both from the myeloid and lymphatic lineage.

In another embodiment, the method to determine a subject's genetic copy number value for stratifying the subject for cancer therapy further comprises providing a report in electronic, web-based, or paper form, to a subject or to another person or entity, a caregiver, a physician, an oncologist, a hospital, a clinic, a third party payor, an insurance company or a government office.

It is preferred that the report comprises one or more of: (i) output from the method, comprising the determined genetic copy number value; (ii) information on the meaning of the determined genetic copy number value, wherein said information comprises information on prognosis and potential or suggested therapeutic options; (iii) information on the likely effectiveness of a therapeutic option, the acceptability of a therapeutic option, or the advisability of applying the therapeutic option to a subject having a decreased or increased genetic copy number value; or (iv) information, or a recommendation on the administration of a drug, the administration at a preselected dosage, or in a preselected treatment regimen, in combination with other drugs, to the subject.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 1 shows an example calculation for the statistical noise according to the invention. The calculation was performed with 5 genes (indicated in the first column), with each gene having a different number of partitions (second column), i.e. copy number probes corresponding to e.g. sub-portions of a gene such as exons or parts of exons, whose size is typically defined by technical parameters of hybrid capture approaches or similar methods. For these genes the mean copy number ("mean CN"), the standard error of the copy number ("SE"), the standard error divided by the mean copy number ("SE/mean CN"), the standard deviation of copy numbers of partitions ("SD") and the standard deviation divided by the mean copy number ("SD/mean CN") was determined. The values for SD ($6^{th}$ column) are linked to the values for SE ($4^{th}$ column) such, that each SD value is the product of the square root of the number of partitions times the SE value. The SE/mean CN values can subsequently be added up and then divided by 5 (corresponding to the number of genes in this example) to obtain the normalized noise measure value MRSE (mean relative standard error) indicated at the bottom of the figure. Alternatively the SD/mean CN values can be added up and then divided by 5 (corresponding to the number of genes in this example) to obtain the alternative variant of the noise measure MCV (mean coefficient of variation), also indicated at the bottom of the figure. In the example of FIG. 1 the MRSE is 0.0646, whereas the MCV for the same genes and partitions yields a value of 0.2366. When comparing the values of SD/mean CN and SE/mean CN for the gene HRAS and the corresponding values for other genes, it becomes apparent that the MRSE value emphasizes genes with a small number of partitions (as is the case for HRAS). In contrast, the MCV value accentuates genes with few or many partitions on an equal footing.

Figure 2:
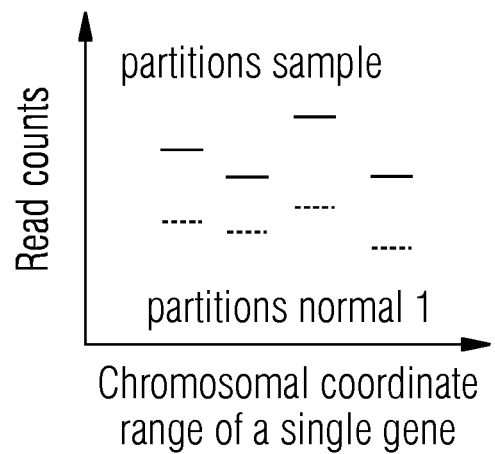
FIG. 2 shows schematic examples of low noise (left hand side) and high noise (right hand side) calculated according to methods of the invention and provides an intuitive explanation, why it is reasonable to select the normal in a way that the noise measure is minimized. In the upper panel the read count distribution of partitions, which are the copy number probes of a single gene, of a sample (solid lines) and normal samples (dotted lines) along the genome (chromosomal coordinate range of a single gene) is indicated. Each normal typically has a different read count distribution. Since the copy number is calculated in the prior art by forming a normalized read count ratio (i.e. the ratio of sample read count/normal read count) for each normal a different partition copy number is obtained (see lower panel of FIG. 2).
Figure 2:
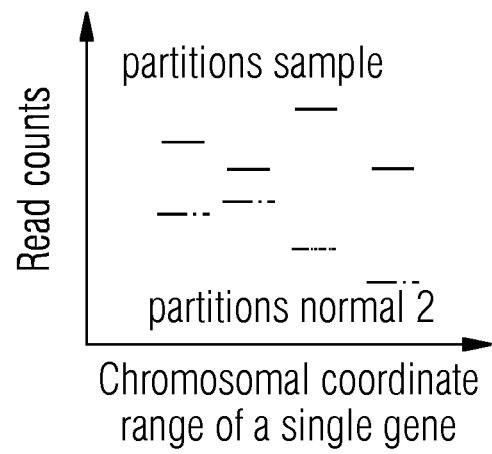
Figure 2:
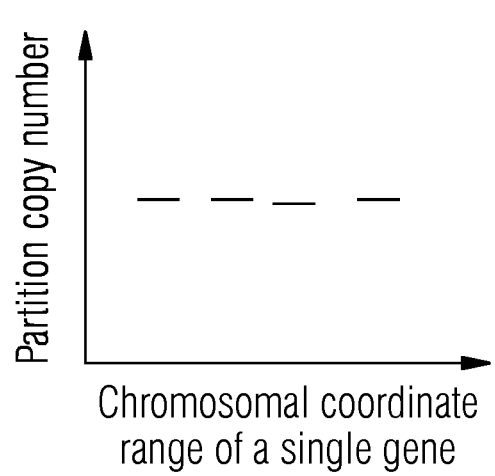
Figure 2:
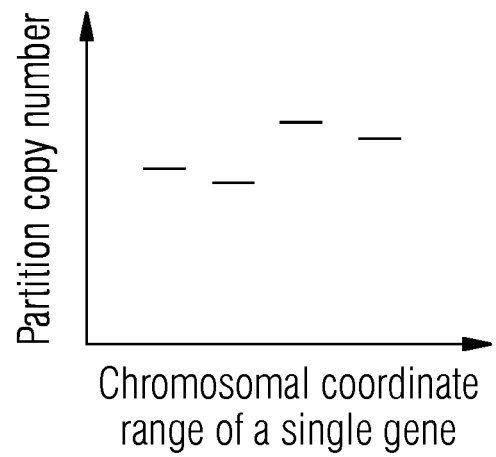

In the lower left hand diagram the calculated partition copy numbers show a small standard deviation and the resulting mean copy number for the gene a small standard error, whereas in the lower right hand diagram the calculated partition copy numbers show a large standard deviation and the mean gene copy number shows a large standard error. If for a certain normal 2 the situation for most of the genes (of a large enough gene panel) is similar to the one shown on the right hand side of FIG. 2 a large noise measure value (as SE/SD are large) may be obtained for normal 2. In contrast, if for another normal 1 the situation for most of the genes is similar to the one shown on the left hand side, a smaller noise measure value (as SE/SD are smaller) may be obtained for normal 1. By choosing an appropriate normal with similar coverage distribution as the tumor sample (and thereby minimizing the noise measure), the apparent noise in the data can effectively be reduced.

Figure 3:
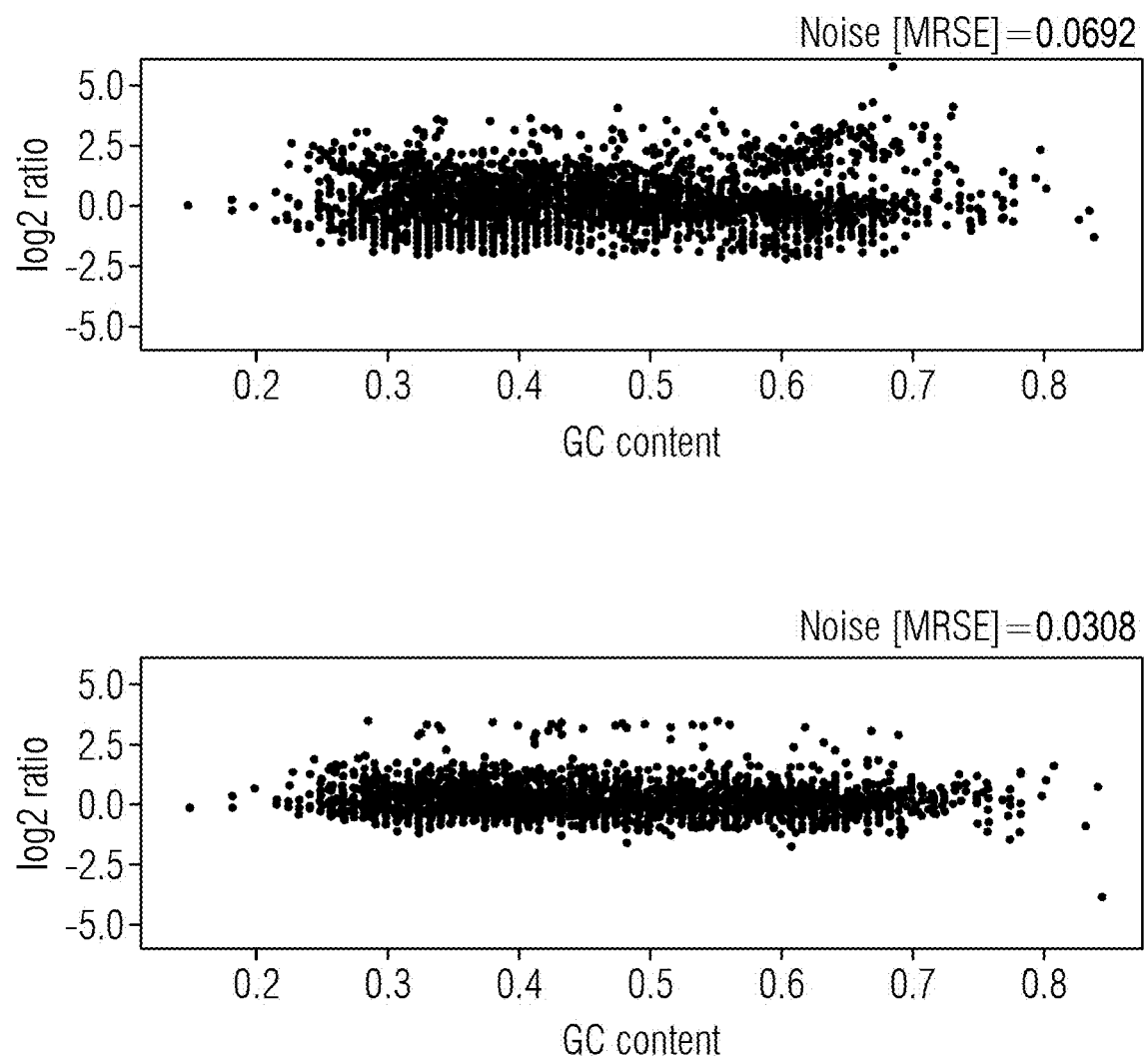

FIG. 3 shows examples of high statistical noise and low statistical noise values calculated according to methods of the invention. The figure shows normalized log 2 ratios of read counts from a tumor sample over read counts of normal samples for a 39 genes panel. For the calculation shown in the upper plot a different normal sample was used than in the lower plot. The noise calculation associated with the samples used for the upper plot results in a noise (MRSE) value of 0.0692, whereas the calculation associated with the samples of the lower plot yields a noise (MRSE) value of 0.0308. The normal sample used in the context of the upper plot thus does not fit to the tumor sample, which is reflected by the statistical noise difference of 0.0692 vs. 0.0308. The plots show that the difference in noise levels is correspondingly reflected in differences of spread of log 2 ratios.

Figure 4:
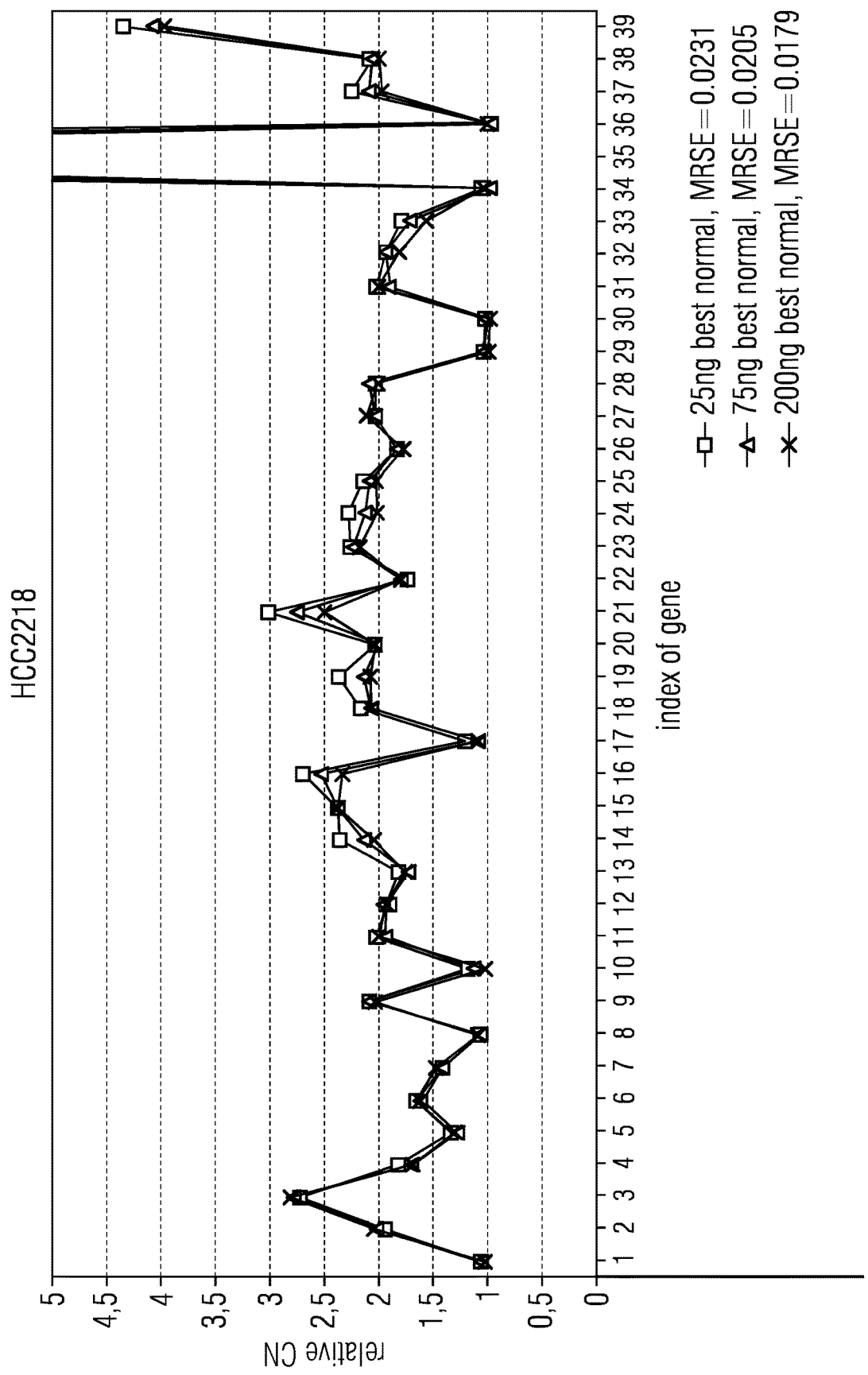
Figure 5:
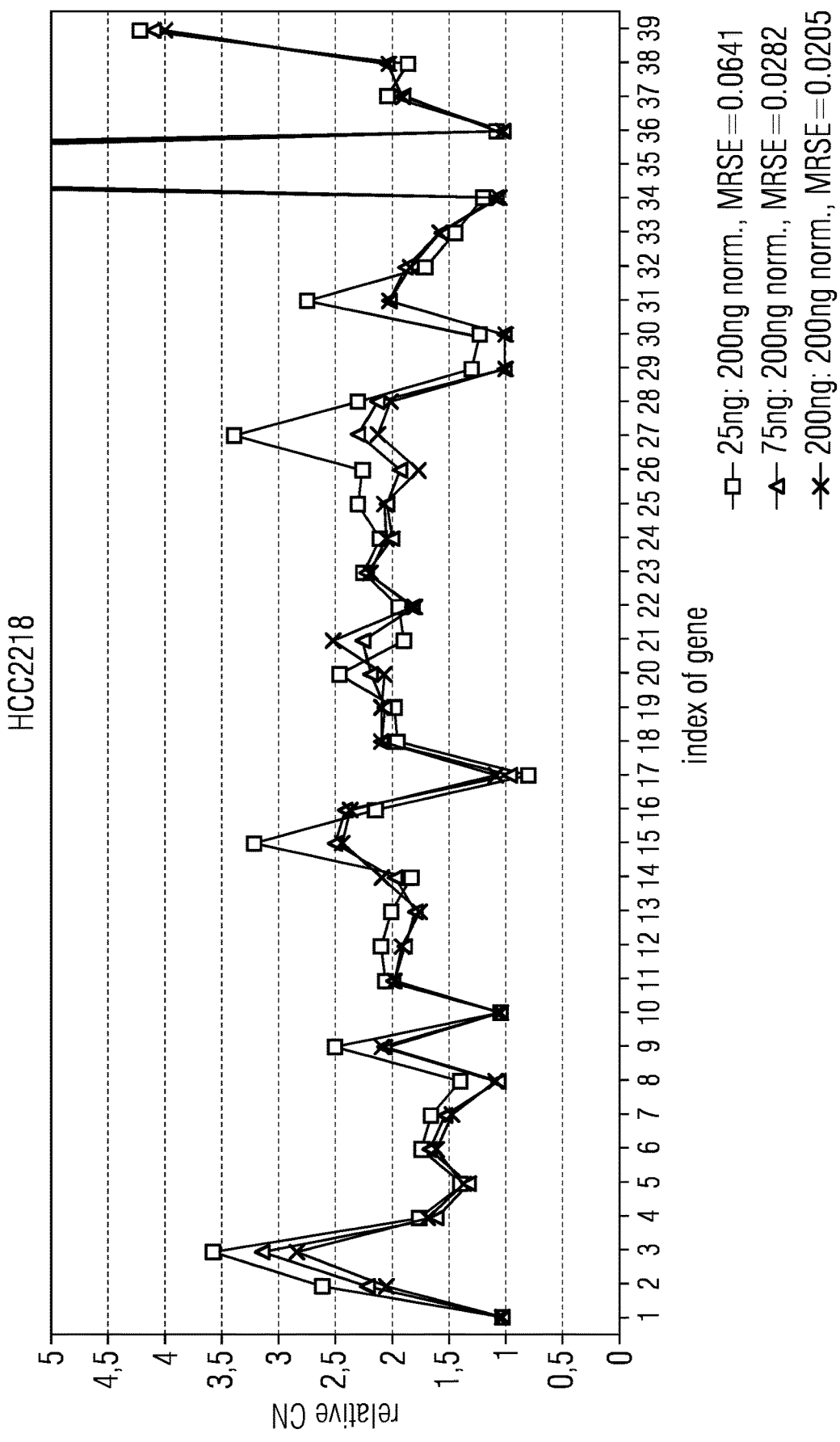

FIGS. 4 and 5 show examples for copy number data, for the case of choosing the best normal (i.e. one which minimizes the noise measure according to the invention; see FIG. 4) and for the case of choosing a single fixed normal (with 200 ng input material; see FIG. 5). The Figures depict the correlation of reproducibility of calculated copy number values with the noise measure values calculated according to methods of the invention. The diagrams show calculated relative copy numbers (not taking into actual ploidy factors, but assuming ploidy 2) for cell line HCC2218, which differ according the amount of sample material used for the analysis. In FIG. 4 copy numbers of the above mentioned cell line with different amounts of input DNA material of 25 ng, 75 ng and 200 ng are given together with their calculated noise measure. For this calculation the best normal out of the cohort (based on noise measure) was chosen. This resulted in noise levels (MRSE) of 0.0231 (for 25 ng), 0.0205 (for 75 ng) and 0.0179 (for 200 ng). Therefore one obtains similar (and low) noise values for the different input materials of the cancer cell line in this context (best normal). In addition all copy numbers agree well for the different input materials. In FIG. 5 copy number values of the cell line sequenced with 25 ng, 75 ng and 200 ng of DNA input material are depicted. In this case, for the calculation of the copy numbers, not the normal of the normal cohort that minimizes the noise measure was used, but a single fixed normal, which was sequenced with 200 ng DNA input material, was used to generate read count ratios and copy numbers. This resulted in noise levels (MRSE) of 0.0641 (for 25 ng), 0.0282 (for 75 ng) and 0.0205 (for 200 ng). The noise for the cancer cell line sequenced with 25 ng of DNA input has a more than 3 times higher noise value than the sample sequenced with 200 ng of DNA input. The high noise in the 25 ng setting is also reflected by the fact, that the copy numbers for some genes are significantly different from the copy numbers generated with 75 ng and 200 ng input material. The 200 ng normal therefore "fits" only well to the 200 ng cancer cell line data, less well to the 75 ng cancer cell line data, and much worse to the 25 ng cancer cell line data. The plots depicted in FIGS. 4 and 5 hence show that the procedure to pick the best normal based on the noise measure as defined in the invention largely increases reproducibility, in particular for settings, where the input material may vary strongly from sample to sample, as the quantification of input material can be a difficult task in a routine diagnostic setting.

Figure 6:
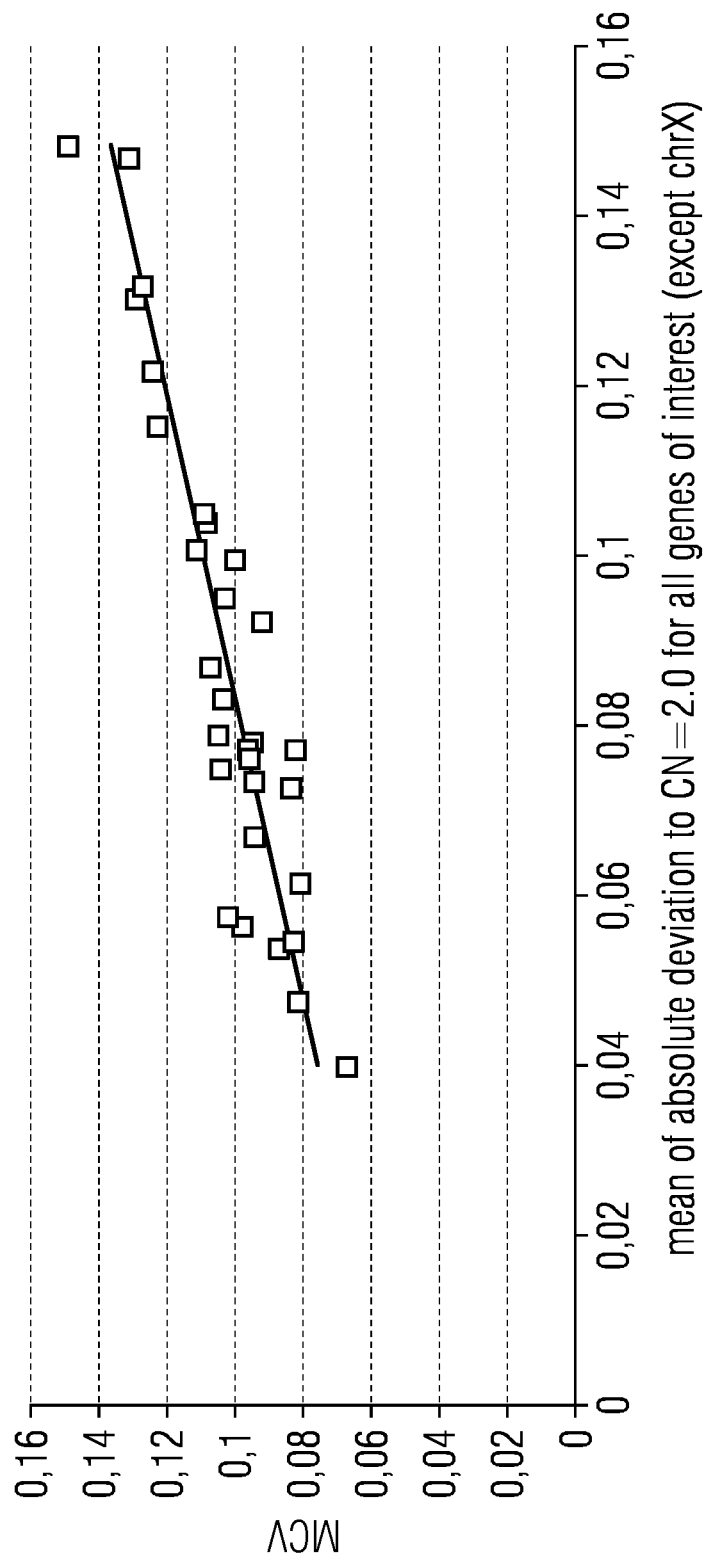

FIG. 6 depicts a calibration approach to determine a noise threshold for noisy samples according to the present invention. Shown is a normalized noise measure (here: MCV) after GC correction vs. the mean value of absolute deviation to CN=2 of all calculated copy numbers after GC correction of genes of interest. The absolute deviation to CN=2 measure is a direct measure of the noise which can be applied in the calibration setting as all of the genes in the used HMN normal cell lines have a well defined copy number state of CN=2. The plot thus depicts the correlation of a direct noise measure with simple interpretation (which is, however, only applicable in calibration settings, when copy numbers are well defined and known) to the noise measure according to the present invention (which is less direct, but more generally applicable, e.g. in the diagnostic setting, when real copy numbers in a sample are unknown and to be determined). Genes on chromosome X were excluded in the analysis, as they can have CN=4, if the cell line was derived from female DNA.

FIG. 7 depicts the same diagram as FIG. 6, additionally indicating as "A" a value of mean of absolute deviation to CN=2 which allows to formulate a direct (significance) criterion (e.g.: "For HapMap normals the mean absolute deviation to CN=2 shall not be larger than 0.1"), which can then be translated to a noise level threshold value (see the arrow to the y-axis). Genes on chromosome X were excluded in the analysis, as they can have CN=4, if the cell line was
derived from female DNA.

FIG. 8 shows a calibration approach to determine a noise threshold for noisy samples according to the present invention. Shown is a normalized noise measure (here: MCV) after GC correction vs. the maximum value of absolute deviation to 2 after GC correction for a copy number of a gene of interest. The plot depicts the correlation of a direct noise measure with simple interpretation to the noise measure according to the invention. The diagram additionally indicates as "A" a value of maximum absolute deviation to CN=2 which allows to formulate a direct (significance) criterion (e.g. "For HapMap normals the maximum absolute deviation to CN=2 of any gene in the panel shall not be larger than 0.5") which can then be translated to a noise level threshold value (see the arrow to the y-axis). Genes on chromosome X were excluded in the analysis, as they can have CN=4, if the cell line was derived from female DNA.

DETAILED DESCRIPTION OF EMBODIMENTS

Although the present invention will be described with respect to particular embodiments, this description is not to be construed in a limiting sense.

Before describing in detail exemplary embodiments of the present invention, definitions important for understanding the present invention are given.

As used in this specification and in the appended claims, the singular forms of "a" and "an" also include the respective plurals unless the context clearly dictates otherwise.

In the context of the present invention, the terms "about" and "approximately" denote an interval of accuracy that a person skilled in the art will understand to still ensure the technical effect of the feature in question. The term typically indicates a deviation from the indicated numerical value of ±20%, preferably ±15%, more preferably ±10%, and even more preferably ±5%.

It is to be understood that the term "comprising" is not limiting. For the purposes of the present invention the term "consisting of" or "essentially consisting of" is considered to be a preferred embodiment of the term "comprising of". If hereinafter a group is defined to comprise at least a certain number of embodiments, this is meant to also encompass a group which preferably consists of these embodiments only. Furthermore, the terms "(i)", "(ii)", "(iii)" or "(a)", "(b)", "(c)", "(d)", or "first", "second", "third" etc. and the like in the description or in the claims, are used for distinguishing between similar elements and not necessarily for describing a sequential or chronological order.

It is to be understood that the terms so used are interchangeable under appropriate circumstances and that the embodiments of the invention described herein are capable of operation in other sequences than described or illustrated herein. In case the terms relate to steps of a method, procedure or use there is no time or time interval coherence between the steps, i.e. the steps may be carried out simultaneously or there may be time intervals of seconds, minutes, hours, days, weeks etc. between such steps, unless otherwise indicated.

It is to be understood that this invention is not limited to the particular methodology, protocols etc. described herein as these may vary. It is also to be understood that the terminology used herein is for the purpose of describing particular embodiments only, and is not intended to limit the scope of the present invention that will be limited only by the appended claims.

The drawings are to be regarded as being schematic representations and elements illustrated in the drawings are not necessarily shown to scale. Rather, the various elements are represented such that their function and general purpose become apparent to a person skilled in the art.

Unless defined otherwise, all technical and scientific terms used herein have the same meanings as commonly understood by one of ordinary skill in the art.

As has been set out above, the present invention concerns in one aspect a method for determining the statistical noise level in the calculation of a subject's genetic copy number values in massively parallel nucleic acid sequencing data derived from a sample, comprising: (a) obtaining massively parallel sequencing information of a subject's sample and of a cohort of normal samples for a defined set of genomic loci as nucleic acid sequence reads; (b) aligning said nucleic acid sequencing reads to a reference sequence; (c) determining copy number values using a median normalized ratio of sample read count data and normal read count data as obtained in step (a); (d) determining the ratio of a standard error value or a standard deviation value to a copy number value as determined in step (c) at each locus of said defined set of genomic loci; (e) adding the ratios as determined in step (d), optionally multiplying each ratio with a weight factor corresponding to the clinical relevance of the locus;

(f) obtaining a value for the statistical noise level in a subject's genetic copy number wherein said value for the statistical noise level is the sum of added ratios as obtained in step (e); and (g) normalizing the value obtained in step (f) by the size (e.g. number of genes) of the defined set of genomic loci or by the sum of all applied weights for the defined set of genomic loci if different weights are applied.

As used herein, the term "genetic copy number" relates to the number of copies of a gene or portion of a gene or of a genomic region comprising one or more than one gene or of a genomic segment or of a chromosome, or in certain embodiments also of the entire genome or substantial portions thereof per cell. In certain embodiments, the number of genes etc. may be derived from a specific subset of genomic segments or targeted sequences. A "targeted sequence" may thus comprise any genomic sequence segment which is considered of interest for the determination of the genetic copy number. It may include coding sequences, or coding sequences and non-coding sequences. For example, the copy number may be measured in relation to targeted sequences including exonic sequences only, or in relation to combinations of exonic sequences and additional elements such as introns and/or other genomic elements. It is preferred that the copy number is measured in relation to exonic sequences. In specific, different embodiments, the copy number may also be measured in relation to further elements of the genome. In specific, additional embodiments, regulatory sequences such as promoter, or terminator sequences may be included in a targeted sequence. The term "genetic copy number" relates typically to the copy number of diploid organisms, wherein a copy number of 2 is a default situation, with a copy number of <2 indicating a deletion of a gene or genomic region, chromosome or genome etc. and a copy number of >2 indicating a duplication or amplification of a gene or genomic region, chromosome or genome etc. In specific embodiments, the methods of the present invention may also be used in a non-diploid context as, for example, a cancer disease may alter the ploidy of initially diploid cells. It is also envisaged by the present invention that the ploidy of a cell, cell population or organism may be determined independently, e.g. according to procedures known to the skilled person. If non-diploid cells are analysed, the noise value calculation is identical to what is described above, but the copy numbers might either be described as amplified/deleted with respect to the mean ploidy of the cell or again with respect to CN=2.

The term "statistical noise level" as used herein refers to the level of unexpected variability within the value calculated for the genetic copy number. Generally, noisy data or noisy values are rendered meaningless by the existence of too much variation. Accordingly, any meaningful signal or value may be obscured by random data, i.e. statistical noise.

The term "massively parallel nucleic acid sequencing data" as used herein relates to sequence data obtained by any technique suitable to provide sequence data in a high-throughput approach. It typically includes next-generation sequence (NGS) or second generation sequencing techniques. The massively parallel sequencing approach includes any sequencing method that determines the nucleotide sequence of either individual nucleic acid molecules or expanded clones for individual nucleic acid molecules in a highly parallel fashion. For example, more than $10^8$ molecules may be sequenced simultaneously. The sequencing may be performed according to any suitable massive parallel approach. Typical platforms include Roche 454, GS FLX Titanium, Illumina, Life Technologies Ion Proton, Oxford Nanopore Technologies, Solexa, 20 Solid or Helicos Biosciences Heliscope systems.

Obtaining massively parallel sequencing information means that any suitable massively parallel sequencing approach as mentioned, or as known to a skilled person, can be performed. The sequencing may include the preparation of templates, the sequencing, as well as subsequent imaging and initial data analysis steps.

Preparation steps may, for example, include randomly breaking nucleic acids such as genomic DNA, into smaller sizes and generating sequencing templates such as fragment templates. Spatially separated templates can, for example, be attached or immobilized at solid surfaces which allows for a sequencing reaction to be performed simultaneously. In typical examples, a library of nucleic acid fragments is generated and adaptors containing universal priming sites are ligated to the end of the fragments. Subsequently, the fragments are denatured into single strands and captured by beads. After amplification and a possible enrichment, e.g. as defined in more details herein below, a huge number of templates may be attached or immobilized in a polyacrylamide gel, or be chemically crosslinked to an amino-coated glass surface, or be deposited on individual titer plates. Alternatively, solid phase amplification may be employed. In this approach forward and reverse primers are typically attached to a solid support. The surface density of amplified fragments is defined by the ratio of the primers to the template on the support. This method may produce millions of spatially separated template clusters which can be hybridized to universal sequencing primers for massively parallel sequencing reactions. Further suitable options include multiple displacement amplification methods.

Suitable sequencing methods include, but are not limited to, cyclic reversible termination (CRT) or sequencing by synthesis (SBS) by Illumina, sequencing by ligation (SBL), single-molecule addition (pyrosequencing) or real-time sequencing. Exemplary platforms using CRT methods are Illumina/Solexa and HelicoScope. Exemplary SBL platforms include the Life/APG/SOLiD support oligonucleotide ligation detection. An exemplary pyrosequencing platform is Roche/454. Exemplary real-time sequencing platforms include the Pacific Biosciences platform and the Life/Visi-Gen platform. Other sequencing methods to obtain massively parallel nucleic acid sequence data include nanopore sequencing, sequencing by hybridization, nano-transistor array based sequencing, scanning tunneling microscopy (STM) based sequencing, or nanowire-molecule sensor based sequencing. Further details with respect to the sequencing approach would be known to the skilled person, or can be derived from suitable literature sources such as Goodwin et al., Nature Reviews Genetics, 2016, 17, 333-351, or van Dijk et al., Trends in Genetics, 2014, 9, 418-426.

A preferred sequencing method is sequencing by synthesis.

Correspondingly obtained data are provided in the form of sequencing reads which may be single-end or paired-end reads. Obtaining such sequencing data may further include the addition of assessment steps or data analysis steps.

Furthermore, the presently described methodology may be used with any suitable sequencing read length. It is preferred to make use of sequencing reads of a length of about 50 to about 200, or about 75 to about 150 nucleotides, e.g. 50, 60, 70, 80, 90, 100, 110, 120, 130, 140, 150, 160, 170, 180, 190, 200 or more nucleotides or any value in between the mentioned values. Most preferably, a length of 80 nucleotides is employed.

The terms "alignment" or "sequence alignment" or "aligning" as used herein relate to the process of sequence comparison and matching a sequencing read with a sequence location, e.g., a genomic location. In the context of the present invention alignment exclusively relates to nucleotide sequences. For the performance of an alignment operation or sequence comparison any suitable algorithm or tool can be used. Preferred is an algorithm such as the Burrows-Wheeler Aligner (BWA), e.g. as described by Li and Durbin, 2009, Bioinformatics, 25, 1754-1760.

Information on the position where an alignment correspondence between a sequencing read and a reference sequence was detected may be stored together with the sequence information. For example, position information, information on the degree of correspondence, version and identity information on the reference sequence etc. may be stored together with the sequence information. In preferred embodiments, a format such as BAM, SAM or CRAM may be used. BAM and SAM formats are designed to contain the same information. The SAM format is a human readable format, and easier to process by conventional text based processing programs, such as, for example, standard Linux commands or python. The BAM format provides binary versions of the same data, and is designed to provide a good compression rate. The CRAM format is similar to the BAM format. In this format the compression is driven by the reference the sequence data is aligned to.

The term "reference sequence" as used herein relates to a sequence, which is used for alignment purposes within the context of the present invention. The reference sequence is typically a genomic sequence or part of a genomic sequence. In typical embodiments, the reference sequence is a human genomic sequence. In specific embodiments, the reference sequence may alternatively be a non-human genomic sequence such as monkey-, mouse-, rat-, bovine-sequence, a domestic animal sequence, a companion animal sequence etc. The sequence may either be provided in a sense direction, or in a reverse-complement direction. The term "sense" or "sense direction" corresponds to the plus strand of a duplex nucleic acid.

The term "reverse complementary", "reverse-complement" or "reverse complementary direction" corresponds to the minus strand of a duplex nucleic acid. The reference sequence may be selected as any suitable genomic sequence derivable from databases as known the skilled person. For example, a reference sequence may be derived from the reference assembly provided by the Human Genome Reference Consortium. Also envisaged are further similar reference sequences. The reference sequence may further be limited to certain sectors of the genome, e.g. specific chromosomes, or parts of a chromosome, e.g. exons or certain genes, groups of genes or gene clusters etc. It is preferred that the reference sequence is a well established, curated and/or controlled sequence which comprises advantageously no or only a minimal proportion of sequencing errors.

A "subject's sample" as used herein may be any suitable sample derived from a subject. It is preferred that the sample is a tumor sample, i.e. the nucleic acids may be extracted from a tumor of a patient. Also envisaged is to make use of previously deposited samples, e.g. samples derived from the umbilical cord.

A "normal sample" or "normal" as used herein relates to a sample which is known to have a non-aberrant copy number. Typically, the normal sample is diploid with no copy number aberrations w.r.t. the used reference genome (i.e. usually copy numbers of genes will be 2, except for cases, where the gene occurs multiple times on the reference genome). A normal or normal sample may typically be understood as a reference or reference sample since copy number alterations are calculated w.r.t. this reference or normal sample. This means amplifications/deletions are typically computed relative to the copy number in the reference (normal) sample. Further information can be obtained from suitable literature sources such as Talevich et al., 2016, PLoS Comput Biol, 12(4):e1004873). In a preferred embodiment, the normal sample's characteristics (e.g. diploidy, no copy number aberrations) has been independently confirmed. The confirmation may, for example, be based on the fact that it was tested and characterized in more than one available publication or project, preferably by trusted third parties or consortia, to confidently know its copy number status. In certain embodiments, the term "normal sample" also refers to a group or cohort of more than one sample. Accordingly, a cohort of normal samples relates to a group of samples which share as defining characteristic the fact that it is diploid with no copy number aberrations w.r.t. the used reference genome. The members of the normal sample cohort may, however, have been obtained from different subjects, analyzed with different sequencing machines, on the basis of different sequencing approaches, by using different reagents, at different times and/or by different people etc. A cohort of normal samples may comprise any suitable number of normal samples, e.g. 2, 5, 10, 15, 20, 25, 30, 35, 40, 45, 50, 55, 60, 65, 70, 75, 80, 85, 90, 95, 100 or more than 100 normal samples. Within a cohort of samples a sub-cohort of samples may exist. A "sub-cohort" may share more than one defining characteristic, e.g. besides the fact that it is diploid with no copy number aberrations w.r.t. the used reference genome, the samples may have been sequenced on the same machine, they may have been derived from the same subject etc. A further defining characteristic shared among sub-cohorts may be that the normal samples produce significantly lower noise measure values for copy numbers in a certain sample. Such a sub-cohort of samples is suited for being used for normalization of said samples. In specific embodiment, the normal sample is sample derived from and/or managed by the Hapmap project. These samples are leukocytes with an established copy number of 2, which were immortalized by infection with Epstein Bar virus. Corresponding information can also be derived from suitable literature sources or databases such as https://www.genome.gov/10001688/international-hapmap-project/. In further alternative embodiments, a normal sample may be derived from a healthy subject, i.e. a subject having copy number of 2, by performing a biopsy.

The wording obtaining massively parallel sequencing information for "a defined set of genomic loci" as used herein accordingly relates to the acquirement of sequence information as described above for a subset of the genome. Such a subset may be a part of one or more chromosomes, or a sub-chromosomal region. Such regions may further comprise more than one sub-chromosomal region from two or more chromosomes. The genomic loci may, in preferred embodiments, correspond to genes, more preferably to coding sequences of genes, thus excluding regulatory sequences, introns, terminator sequences, promoters etc. In alternative embodiments also intronic sequences and/or regulatory sequences etc. are included. In preferred embodiments, the genomic loci comprise gene regions. The term "gene region" as used herein relates to one or more segments of a genome which encode a specific protein, or any variant of said protein, e.g. by splicing, as duplicated version etc. In a particularly preferred embodiment, each genomic locus or gene region corresponds to one gene.

In specific embodiments, the genomic loci as mentioned herein comprises a preselected panel of genes. The term "preselected panel of genes" as used herein refers to a number of genes which are known from literature sources or previous analyses to have an increased predictive value in diagnosis. Such genes may, for example, differ in accordance with the diagnostic approach, a disease to be analyzed, the species to be analyzed etc., e.g. human panels may differ from panels of domestic or companion animals etc. In preferred embodiments, the preselected panel of genes is a panel of genes associated with a disease or associated with the development of a disease. Whether a gene is associated with a disease or the development of a disease can be derived from suitable literature or database resources, e.g. Gene Cards (accessible at https://www.genecards.org) or Mala Cards (accessible at https://www.malacards.org) or the like. The disease may, in particularly preferred embodiments, be cancer. It is emphasized that in certain embodiments panels preselected for the diagnosis of cancer or for the guidance of cancer related treatment decisions may comprise any combination or selection of genes, i.e. also genes which are not per se related to the etiology of cancer or associated with cancer. In a typical situation a "gene of interest" as used herein is comprised in the predefined panel of genes.

It is preferred that the preselected panel of genes is a panel of at least 10 genes or gene regions, of at least 30 genes or gene regions, or of at least 100 genes or gene regions. Also envisaged are, in certain embodiments, panels comprising 300 or more than 300 genes. For example, a panel of 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300 or more genes or of any number of genes in between the mentioned numbers may be employed. The panel of genes to be analyzed may comprise one or more of genes involved in cancer or the development of cancer, or may comprise a mixture of genes involved in cancer or the development of cancer, and genes which have no linkage to cancer or the development of cancer. Examples of genes to be comprised in the panel of genes can be derived from suitable databases, such as for example, the COSMIC (catalogue of somatic mutations in cancer), which can be accessed at http://cancer.sanger.ac.uk/cosmic, the candidate cancer gene database accessible at http://ccgd-starrlab.oit.umn.edu, or database ClinVar, accessible at https://www.ncbi.nlm.nih.gov/clinvar. Also envisaged are the databases provided by NIH concerning predictive human or mammalian genes. It is further preferred that the panel of genes comprises genes which have a high or significant relevance for the disease under considerations, e.g. for cancer. Examples of genes, wherein one or more of the genes or part of the genes, such as one or more exons, are comprised in the panel of genes, are provided in Table 1:

TABLE 1

| | | | | |
|---|---|---|---|---|
| AKT3 | MLH3 | POLE | ANKRD30A | ZEB1 |
| ALG10 | MSH3 | NFE2L2 | IL21R | VAMP2 |
| APC | MST1R | CUL3 | BAP1 | WT1 |
| APLNR | MTOR | PREX2 | PIK3C2B | C7orf65 |
| ARAF | MYBPC2 | KSR1 | POLG | FGF23 |
| ARID2 | MYC | PRKDC | PIK3CD | ASL |
| ATM | NCOA4 | PDGFRA | FANCE | SMYD1 |
| ATR | NRAS | INHBA | CSF1R | EIF4EBP1 |
| AURKA | NSD1 | NOTCH2 | TGFBR2 | PROM2 |

TABLE 1-continued

| | | | | |
|---|---|---|---|---|
| B2M | NTRK2 | IFNGR2 | IRF4 | C7orf69, PKD1L1 |
| BCL2 | PALB2 | PLCG2 | MAP2K2 | CD74 |
| BCL2L1 | PDCD1LG2 | SDHA | HLA-DOB | CCL3 |
| BLM | PGBD3 | TSHR | NTRK1 | COX6B1 |
| BMPR1A | PIK3CA | RET | DCUN1D4 | CCL1 |
| BRCA1 | PIK3CB | SMARCB1 | AKT1 | LGSN |
| BRCA2 | PIK3CG | FLT1 | GATA1 | GABRA4 |
| BRIP1 | PIK3R1 | MRE11 | TAF3 | IFNA4 |
| BTK | POLH | DAXX | TAP1 | IFNA8 |
| CASP8 | POT1 | ZFHX3 | CCR7 | CSF3R |
| CCND1 | PRDM1 | HGF | MAGI2 | CCND3 |
| CD79B | PTPRK | IGF2R | MYCN | SERTM1 |
| CDC73 | QKI | KMT2A | AURKB | OR4X1 |
| CDK12 | RAD50 | GNAS | POTEA | C8orf4 |
| CDK4 | RAD51C | PPP2R1A | XPA | TAC4 |
| CDK6 | RAD51D | ASXL1 | XRCC1 | CCL2 |
| CDKN1A | RAD54L | MAP2K3 | NFKBIA | DIRAS1 |
| CDKN1B | RAF1 | PDGFRB | CCND2 | PLCXD3 |
| CDKN2A | RB1 | TOP1 | KMT2D | C7orf66 |
| CDKN2B | RICTOR | ACVR1B | CARD11 | FADD |
| CDKN2C | RIT1 | RAC1 | VHL | C6 |
| CHEK1 | ROS1 | PRKCI | MEN1 | SMIM19 |
| CRCP | RPL23 | MSH5 | ARID1B | NSMCE2 |
| CRKL | RPTOR | KAT6A | CIC | GZMA |
| CTCF | SDHC | EPHA5 | RPL10A | PLP2 |
| CTNNA1 | SERPINB3 | CWH43 | KMT2B | ORMDL3 |
| CTNNB1 | SERPINB4 | ABL2 | SMARCA4 | SPACA3 |
| DDB2 | SF3B1 | BRAF | JUN | PPP1R3A |
| DDR2 | SLIT2 | PMS2 | CD79A | MTPN |
| DICER1 | SMAD2 | U2AF1 | DOT1L | POLD4 |
| EMSY | SMAD3 | U2AF1L5 | CREBBP | HCRTR2 |
| EP300 | SMAD4 | MYCL | CBFB | IL18RAP |
| EPHA3 | SPOP | TSC2 | C8orf86 | IFNA5 |
| EPHA7 | SRP54 | PTEN | IKBKE | KRTAP9-7 |
| ERBB4 | STAG2 | MSH6 | SDHD | CCDC70 |
| ERCC5 | STAT3 | BRD2 | PIK3R2 | CALN1 |
| ERCC6 | STK11 | FLCN | TAPBP | UBL3 |
| ERRFI1 | SYK | BARD1 | DEFB108B | NRG1 |
| EZH2 | SYT10 | NPM1 | RNF43 | YPEL5 |
| FANCC | TCF7L2 | PTPRT | RPIA | TEX12 |
| FANCF | TNFAIP3 | SUFU | FOXO3 | WNT16 |
| FANCG | TOP2A | CBL | VEGFA | PABPC3 |
| FANCI | TP53 | CHEK2 | TNFRSF14 | CHST15 |
| FANCL | TSC1 | SDHAF2 | BRD3 | BET1 |
| FANCM | WISP3 | FANCA | NREP | SPATA31A6 |
| FAS | XPC | MSH2 | IGF2 | PGM5 |
| FAT1 | ZNF217 | ERCC4 | NOTCH4 | VWC2 |
| FGF10 | ARHGEF12 | PTPRC | ZNF679 | PSMB3 |
| FGF6 | TP53BP1 | FGF14 | ZNF572 | CEBPA |
| FGFR1 | FBXW7 | SOX2 | EPHA2 | LLPH |
| FOXP1 | FANCB | NTRK3 | FGF19 | UFM1 |
| FRS2 | ALMS1 | TAP2 | GFRAL | CNPY2 |
| GEN1 | PRKN | IDH2 | RNPS1 | ANKRD55 |
| GLI1 | HLTF | SDHB | IKZF3 | TES |
| GLTPD2 | NF1 | BCL6 | RBM10 | GSTP1 |
| GNA13 | PIAS4 | SETD1A | TEX37 | MYL4 |
| GNAI2 | EGFR | SLX4 | ZNF479 | TCF23 |
| GNAQ | ATRX | CDK8 | SMIM2 | ZNF99 |
| GNAT2 | RAD54L2 | CD58 | GATA2 | LSM1 |
| GNG2 | PSMB5 | MAP2K4 | GNG7 | ULBP1 |
| GSK3B | PTPN11 | AR | GDF2 | TLCD1 |
| H3F3A | EML4 | AXL | PRR15L | POM121L12 |
| H3F3B | SETD2 | MED12 | OR4C3 | PXDNL |
| HLA-A | BUB1B | NOTCH1 | RECQL4 | VSTM2A |
| HLA-B | SPEN | SUMF2 | OR4A47 | DUSP14 |
| HLA-C | KMT2C | PTCH1 | FLT4 | CBX1 |
| HLA-DQB1 | ERCC3 | RARA | ERCC1 | ZNF208 |
| HLA-DRB1 | NCOA3 | RAD51 | AXIN1 | ZNF257 |
| HNF1A | FANCD2 | CPNE8 | SUMO4 | SLC9A4 |
| HRAS | FLT3 | RAD51B | GATA4 | SNTG1 |
| IDH1 | FGFR2 | FGFR3 | ERCC2 | TFPI2 |
| IFNGR1 | CLSPN | PPM1D | RPRML | C7 |
| INPP4B | REV3L | MAP3K1 | KIF5B | SSX3 |
| IRF1 | HDAC2 | AMER1 | CRLF2 | PLEKHF1 |
| IRF2 | NBN | ESR1 | POLD1 | POMP |
| JAK1 | RANBP2 | MUTYH | SEC61G | TMEM92 |
| JAK2 | CHD4 | BRD4 | FOXL2 | OR10W1 |
| KDR | TRRAP | NF2 | TIAF1 | ZNF804B |
| KIT | PBRM1 | MPL | GABRA2 | OR4B1 |

TABLE 1-continued

| | | | | |
|---|---|---|---|---|
| KRAS | CDH1 | GNA11 | ETV6 | OR9Q1 |
| LRP1B | CCNE1 | FGFR4 | KRTAP4-7 | UQCRFS1 |
| LYN | ERBB2 | KEAP1 | EIF1 | HMGB1 |
| MAD2L1 | ATAD5 | ARID1A | SRC | YEATS4 |
| MAP2K1 | ERBB3 | CHCHD2 | GABRG1 | OR5B17 |
| MCL1 | EPHB1 | HSP90AA1 | NOTCH3 | OR5B3 |
| MDM2 | BMS1 | AXIN2 | CCL16 | TSLP |
| MDM4 | CD274 | IKBKB | FGF4 | TAS2R16 |
| MET | WRN | AKT2 | FGF3 | THEG5 |
| MITF | ABL1 | SETD1B | GATA6 | ZMAT4 |
| MLANA | ALK | SMO | OR4X2 | TMEM97 |
| MLH1 | IGF1R | PDK1 | JAK3 | C2orf70 |

Further examples of genes for the panel of genes according to the present invention may be added to the above list in accordance with scientific knowledge in the field of cancer biology.

The term "size of the defined set of genomic loci" as used herein refers to the number of genes, exons or functional elements included in a defined set of genomic loci, preferably the number of genes. The size may vary significantly depending on the purpose of the analysis, the type of samples analyzed, the number of genes in a panel etc.

The term "sequencing read count data" as used herein relates to the number of sequencing reads per unit, e.g. per defined set of genomic loci, per gene region, per partition. The term "partition" as used herein relates to sub-portions of a gene such as exons or parts of exons, whose size is typically defined by technical parameters of hybrid capture approaches or similar methods. For example, a partition may have a size of about 50 to about 450 nucleotides, or preferably of about 100 to 200 nucleotides. In certain embodiments a preselected panel of genes as defined herein above may comprise between about 1000 to about 20 000 partitions, each partition of the size of about 100 to 300 nucleotides. Corresponding data are further median normalized. Such a normalization is based on the ratios of tumor to normal read counts. The median of the ratios of tumor to normal read counts for all partitions of the sample is computed, and then all ratios are divided by this median value to obtain a normalized read count ratio. The normalization allows to eliminate influence by total coverage on the determination of the copy number value. This normalized ratio can then be converted to copy numbers of the tumor cells in the sample using the ploidy (e.g. 2 for diploid) and tumor purity of the sample, i.e. the fraction of tumor cells over all cells in the sample, which shows a degree of contamination in a typical diagnostic setting. This contamination, which is specifically designated "normal contamination" relates to the patient's tissue material of non-tumor cells, or to the patient's genetic material of non-tumor cells, which is—due to technical reasons (e.g. biopsy procedures, blood cell preparation)—unavoidably present in material obtained in a patient's tumor biopsy or when a patient's blood is obtained. Further shifts/adjustments might be necessary to obtain final integer absolute copy numbers.

The term "standard error value" or "SE value" as used herein relates to the standard deviation of the sampling distribution of the quantity of interest (e.g. mean or median). In the case of a mean gene copy number, the corresponding standard error is the standard deviation of the partition copy numbers within the gene region divided by the square root of the sample size (number of partitions within the gene region). The term "standard deviation value" or "SD value" as used herein relates to the amount of variation or dispersion of a set of data values. Generally, a low SD value indicates that the data points are close to the average of the data set, whereas a high SD value indicates that the data points are spread out over a wide range of values. Within the context of the present invention, the term "standard deviation" is understood to be based on expectation values and is therefore linked to mean gene copy numbers. It is further understood that median copy numbers or trimmed mean copy numbers may, under certain circumstances, not have a simple standard deviation attached to them, which, however, does not compromise the option to calculate a standard error for these copy numbers. According to embodiments of the invention estimated standard deviation and estimated standard error of mean gene copy numbers, e.g. based on some set of data may be calculated according to the following formulas:

$$SD(\text{mean}) = \sqrt{\frac{1}{n-1} \cdot \sum_i (x_i - \bar{x})^2}$$

$$SE(\text{mean}) = \frac{1}{\sqrt{n}} \cdot SD(\text{mean})$$

Formulas 1 and 2

Within Formulas 1 and 2 SD(mean) and SE(mean) refer to the standard error and standard deviation of the mean, n is the number of data points, from which the mean is calculated, x bar is the mean calculated from the n data points, and xi is the data point i out of n data points.

For median copy numbers or trimmed mean copy numbers one can, in specific embodiments, use bootstrapping algorithms to calculate corresponding standard errors. Corresponding algorithms are known to the skilled person or can be derived form suitable literature sources such as Efron and Tibshirani, 1986, Statistical Science, Vol. 1, No. 1, 54-75.

In a central embodiment of the present invention the statistic noise level in the calculation of a subject's genetic copy number value is determined. The determination of the noise level is primarily based on classic copy number determination, i.e. the calculation of a ratio between a test sample sequencing read count and a control or normal sample sequencing read count. The calculation may be performed according to a suitable scheme as known to the skilled person, or in accordance with suitable literature sources such as Talevich et al., 2016, PLoS Comput Biol, 12(4):e1004873. Typically, a normalization step is performed after the ratio has been determined.

Subsequently, the resulting value may, in certain embodiments, be multiplied with the assumed or determined ploidy of the analyzed genome or additional steps are taken to calculate purity and ploidy estimates of the analyzed sample to finally obtain integer absolute copy numbers for each gene of interest. In alternative embodiments, this multiplication step may be skipped if the ploidy is not determined or determinable.

These steps as well as further alternative steps which are also envisaged by the present invention may be derived from Carter et al., 2012 Nat Biotechnol, 30(5):413-421 or M. Riester et al., 2016 Source Code Biol Med, 11:13. However, the reliability of the obtained value very much depends on factors such as quality of nucleic acids, quality of sequencing approaches, but also the choice of the correct normal or control sample.

In order to determine a noise level in a next step the ratio of standard error values to a copy number value as determined in the previous step at each locus of the defined set of loci is calculated.

In a further optional embodiment, if mean copy numbers are under consideration, the ratio of standard deviation values to a copy number value as determined in the previous step at each locus of the defined set of loci may be calculated.

In a next step the ratios for each tested locus which are obtained are added up. The sum obtained in this step indicates a preliminary noise level of the tested sample. In specific embodiments, the value may be modulated by suitable multiplication operations. For example, an obtained value may be weighted up by multiplication with a factor>1 in case of a clinically relevant, highly relevant or extremely relevant locus. Similarly, an obtained value may be weighted down by multiplication with a factor<1 in case of a clinically less relevant, or irrelevant locus. In certain embodiments, only a weighting up operation in case of clinically relevant loci may be performed. Information on clinical relevance may be derivable from suitable literature sources or database entries, e.g. CIViC (https://www.civicdb.org). Generally, the relevance of a locus depends on the disease associated. Also secondary factors such as age of the subject, gender, additional diseases, general health conditions, previous treatments etc. may be considered. A weight factor corresponding to the clinical relevance of a locus may be, in certain embodiments, the factor 2, 3, 4 or 5. For example, for a diagnostic test, which focusses on lung cancer patients, a weight factor of 2 may be used for the genes FGFR1 and MET, for which copy number amplifications were shown to be cancer driving mechanisms in non-small cell lung cancer and are potential therapeutic targets (further information may be derived from Jabs et al., 2017, PLoS ONE, 12(11): e01.37246). In this example, additional weight factors of other genes may be set to 1. Thereby the noise in the genes FGFR1 and MET is given more consideration and impact on the total noise value.

In a final step, the value for a preliminary noise level of the tested sample obtained in the previous step is normalized by the size of the defined set of genomic loci. For example, if more than 50 loci are analyzed, the overall sum of the ratios is higher than in a case in which only, for example, 10 or 20 loci are analyzed. To account for such a disequilibrium a normalization according to the size of the set of genomic loci becomes necessary. The normalization may be performed in accordance with a numerical value for the number of loci. In case the method is performed with an identical set of genomic loci several times (e.g. with different test samples), the normalization step may be skipped since in such a scenario the obtained values are comparable among them. In further embodiments, the normalization may also be performed subsequently, e.g. when a comparison with different sets of genomic loci is intended. In certain embodiments, the method may be performed with different weight factors as described above. In such embodiments the normalization value may be the sum of all applied weights. For example if 10 genomic loci (e.g. 10 different gene regions) are analyzed and 8 of the genomic loci are given weight 1, and two of the genomic loci are given weight 2 (e.g. due to the special relevance of these genomic loci for certain cancer types, which are of interest for the analysis, as can be derived from suitable literature sources or databases such as e.g. Gene Cards (accessible at https://www.genecards.org) or CIViC (https://www.civicdb.org), the normalization calculation is performed as follows: 8*1+2*2=12. Accordingly, the preliminary noise level is divided by 12 to obtain a normalized noise level.

In typical embodiments, the copy number value as determined in step (c) is determined on the basis of mean values. The present invention also envisages different alternative approaches. Thus, in an alternative embodiment the copy number value may be determined on the basis of median values. The term "median value" as used herein relates to the value separating the higher half from the lower half of a certain group of data. In further alternative embodiments, the copy number value is determined on the basis of trimmed mean values. The term "trimmed mean value" as used herein relates to a statistical measure of central tendency. Its determination typically involves the calculation of the mean after discarding given parts of a probability distribution or sample at the high and low end, and typically discarding an equal amount of both.

In a further aspect the present invention relates to a method of reducing the statistical noise level in the calculation of a subject's genetic copy number value in massively parallel nucleic acid sequencing data derived from a sample, comprising carrying out the method for determining the statistical noise level in the calculation of a subject's genetic copy number value as defined herein, wherein said normal sample is selected from a heterogeneous cohort of normal samples, wherein normal sample yields the lowest final noise measure among all normal samples of said cohort with respect to the subject's sample analyzed, or wherein said normal sample is a sub-cohort selected from a heterogeneous cohort of normal samples, wherein said sub-cohort comprises those normal samples which yield the 2, 3, 4 or 5 lowest final noise measures among all normal samples of said cohort with respect to the subject's sample analyzed, and wherein a reduced value for the statistical noise level in a subject's genetic copy number is obtained.

It is further envisaged, that the present invention relates to a method of reducing the statistical noise level in the calculation of a subject's genetic copy number value in massively parallel nucleic acid sequencing data derived from a sample, comprising carrying out the method of determining the statistical noise level in the calculation of a subject's genetic copy number value in massively parallel nucleic acid sequencing data as defined herein, wherein said normal sample is selected from a heterogeneous cohort of normal samples and wherein certain normal samples of low noise are selected from said heterogeneous cohort. Thereby a reduced value for the statistical noise level in a subject's genetic copy number may be obtained.

A reduced value for the statistical noise level as used herein is thus typically obtained by analyzing the subject's sample separately with all the normals in the normal cohort. For each normal, copy numbers and a noise measure can be calculated. The normal data which resembles the subject's sample most in overall coverage distribution and is generated under the most similar conditions (e.g. input material, overall workflow) yields the "lowest noise measure". This particular normal sample is subsequently used for the final analysis and calculation of copy numbers. The results are expected to have a reduced and—for the given cohort of normals—lowest noise final noise measure.

The term "heterogeneous cohort of normal samples" as used herein means that the data of the normal samples within the cohort was obtained with differing quality of the nucleic acids (e.g. derived from FFPE or fresh frozen tissue samples), different sequencing machines, different persons handling the machines, different cell lines, different reagents or different amount of input material etc. This heterogeneity is then reflected in different noise levels obtained, when performing the method for determining the statistical noise level as described herein with respect to a subject's sample to be analysed, i.e. provide a diverse group of noise values.

By using a heterogeneous cohort of normal samples it is advantageously possible to obtain a variety of different noise values with respect to each sample to be analyzed (which may differ for each sample in accordance with subject's sample properties etc.) and thus have the opportunity to find low or very low noise values. For each subject's sample the normal sample yielding such low or very low noise levels may accordingly change. Thus, the heterogeneity of the cohort of normal samples is a prerequisite for obtaining an optimal low noise normal sample with respect to each subject's sample analyzed. In specific embodiments, the heterogeneous cohort may comprise 2-500 normal samples In accordance with the present invention, only a sub-cohort of said heterogeneous group of normal samples may subsequently be used for further analysis, i.e. in order to reduce the statistical noise of the analyzed sample. Preferably, a normal sample is selected if it yields the lowest final noise measure among all normal samples of the heterogeneous cohort with respect to the subject's sample after having performed the method for determining the statistical noise level as described herein. Alternatively, a sub-cohort may be selected which comprises those normal samples which yield the 2, 3, 4 or 5 lowest final noise measures among all normal samples of the heterogeneous cohort with respect to the subject's sample after having performed the method for determining the statistical noise level as described herein. An example for how to treat the sub-cohort of normal for the downstream analysis is as follows: From this sub-cohort an effective normal can be generated, e.g. by taking median or mean values of read counts for all the normals in the sub-cohort for each partition. With these effective normal read counts for each partition, tumor over normal read count ratios can be formed.

In specific embodiments a heterogeneous cohort of normal samples comprises normal samples with a certain sequencing coverage level. The sequencing coverage may, for example, be between about 50× to 10 000×. In preferred embodiments, the sequencing coverage is between about 50× and 5000×. It is particularly preferred that the sequencing coverage is from at least about 100× to at about 3000×, e.g. about 100×, 125×, 150×, 200×, 300×, 400×, 500×, 600×, 700×, 800×, 900×, 1000×, 1500×, 2000×, 2500× or 3000×.

Typically, the sequencing coverage values are determined as coverage values after PCR duplication masking.

In order to be able to assess whether a subject's sample's statistical noise level in the calculation of the subject's copy number value may have an influence on the validity or significance of said copy number value, the calculated noise level has to be compared to a threshold value. Said threshold value has to be calibrated with several parameters used in the calculation. It may hence change and/or has to be modified and/or has to be redefined in accordance with said parameters. The present invention envisages for the definition of said threshold the below outlined procedure. This procedure may be employed for values obtained with the method for determining the statistical noise level in the calculation of a subject's genetic copy number.

The procedure, in particular, comprises as first step (a) the selection of a set of normal samples as a calibration test set, wherein all relevant gene copy numbers are known to have a value of 2. The term "calibration test set" as used herein relates to a group of patients' test samples or derived forms thereof, which are typically not identical to the patient's test sample which is analyzed with respect to its copy number in the main method of the present invention. The calibration test set may, in preferred embodiments, be a group of cell line samples.

The set may have any suitable size, e.g. comprising about 10 to 50 normal samples.

In a second step (b) a disjunct set of normal samples is selected as a calibration reference set, wherein all copy numbers are known to have a value of 2. The term "disjunct set of normal samples" as used herein relates to the use of a different set of normal samples. This different set of normal is hence used as for calibration purposes and thus constitutes a "calibration reference set". The normal samples comprised in said calibration reference set are preferably heterogeneous, i.e. they may, for example, be derived from different nucleic acids or from different cell lines, they may have been handled by different persons, or have been analysed on different sequencing machines, or different input materials were used during their handling etc. The calibration reference set is typically designed such that it can be changed iteratively when performing steps c) to d) of the present calibration procedure. This allows to advantageously obtain both low and large noise values for the calibration test set normals. The advantage of using heterogeneous normals in the calibration reference set is that the definition of thresholds at the lower and higher end, i.e. for low and high noise, is possible. Otherwise, i.e. if the calibration reference set would merely consists of normals, which are very similar to the normals in the calibration test set, it is likely to obtain mainly low noise values which prevents a suitable determination of thresholds for large In a specific embodiment there is a larger heterogeneity within the calibration test set than within the calibration reference set.

This step is followed by next step c) wherein each normal sample in the calibration test set is analyzed to determine the copy number value of all loci of a defined set of genomic loci as defined herein above. In addition, the copy number standard error or the copy number standard deviation as defined herein above is determined. The copy number stand deviation may preferably be determined if mean gene copy numbers are under consideration. For this determination the calibration reference set mentioned in step (b) of the procedure is used for normalization. In this step the best normal (or best normal cohort as described above) out of the reference cohort is chosen for each test sample, such that the noise measure is minimized for each sample (previously described noise reduction).

Subsequently, in step (d) of the procedure, the noise measure value for each of the calibration test samples is calculated as defined in steps (d) to (g) of the method for determining the statistical noise level as outlined herein above is determined.

In a next procedural step (e) a direct noise measure value of the copy number value of step (c) is calculated. This calculation is performed by forming a column vector of deviations to a copy number value 2, wherein each component of the vector is the deviation of the copy number value of a single locus as determined in step (c) from the copy number value 2. The term "direct noise measure" as used herein relates to the fact that in this calibration setting copy numbers of genes of interest are known to have CN=2, so each deviation of the calculated copy numbers to CN=2 is then known to be an error due to noise/bias in the data. In a diagnostic setting the real copy number status of the subject's sample is unknown and to-be-determined, therefore there it is a priori not clear, how large the errors of the determined/calculated copy numbers are w.r.t. to the real copy numbers in the subject's sample. Thus, the sum of deviations from 2 is a direct measure of noise, which is only accessible in the calibration setting. Alternatively if weights are applied in the determination of the to-be calibrated noise measure, identical weights may be applied to the direct noise measure.

Subsequently, in step (f) of the procedure, the p-norm of the vector obtained in step (e) for values of p=1 and/or p→00 (maximum norm) is calculated. The term "p-norm" as used herein refers to a class of vector norms, which encompass simple norms like the sum norm (p=1), the usual Euclidean norm (p=2, which reflects the usual notion of length of a vector) and the maximum norm (p→00) within one framework/formula, by simply changing the parameter p, as is, for example, further explained in Königsberger, Analysis 1, $6^{th}$ ed., 2004, Springer.

Subsequently, in step (g), for the case of p=1, said vector is normalized by the size of the defined set of genomic loci to obtain a mean of absolute deviations to copy number 2 for all genetic copy numbers in said defined set of genomic loci. Alternatively if weights are applied in the determination of the to-be calibrated noise measure, the sum of the weights may be used for normalization in this step. No normalization has to be applied for the case of p→00, as the maximum norm only extracts the maximal deviation, which is the largest absolute value of the vector components.

In a next step (h) of the procedure, the noise measure of each calibration test sample is plotted against the mean absolute deviation to copy number 2 or, in a second plot, the noise measure of each calibration test sample is plotted against the maximum deviation to copy number 2. The plotting may be performed according to any suitable methodology, preferably by using the mean absolute deviation to copy number 2 or the maximum deviation to copy number 2 as x-axis and the determined noise measure as described herein as y-axis.

Subsequently, in step (i) of the procedure, a significance criterion is used for a threshold in terms of the mean absolute deviation to 2 or maximum deviation to 2. It is correspondingly determined to which value of noise measure the chosen criterion translates. Further details on the usage of said significance criterion may be derived from FIGS. 7 and 8 and the corresponding figure legend. To illustrate the usage of the significance criterion, an example reference to the analysis of HapMap normals is provided: in the context of HapMap normals, the normals are analysed as test samples wherein the maximum absolute deviation to CN=2 of any gene in the panel shall not be larger than 0.5. The used criterion of 0.5 below or above 2 is a significance criterion according to the present invention, since the values 2.5 and 1.5 are centrally arranged in-between the integer values 2 and 3 or 2 and 1, respectively, which are expected in view of the fact that the copy numbers typically are integers. Alternatively, a significance criterion according to the present invention may be implemented as follows: in the context of HapMap normals, the normals are analysed as test samples wherein the distribution of differences of determined copy numbers from expected copy numbers (CN=2) is such that the probability to draw a copy number>2.5 (or alternatively >3) or <1.5 (or alternatively <1.0) from this distribution is lower than 5% (in specific embodiments, the probability may also be 1%, or 0.01%, or 0.001%). The used criterion is a significance criterion according to the present invention, as the probability of 5% (or, in specific embodiments, 1%, or 0.01% or 0.001%) can be considered as a significance level to not deviate too much from expected copy numbers for the HapMap normals.

In a final step (j) of said procedure said threshold obtained in step (i) is applied to the value for the statistical noise level obtained in a method for determining the statistical noise level in the calculation of a subject's genetic copy number value, or the method of reducing the statistical noise level in the calculation of a subject's genetic copy number value as defined herein above.

According to certain embodiments, different threshold values may be obtained, wherein, for example, one threshold value (e.g. threshold value A) indicates a necessity for modifying a copy number valued calculated, or wherein, in a different example, another threshold value (e.g. threshold value B) indicates a necessity for excluding a sample from further employment. Also envisaged are additional threshold values (e.g. C, D, E etc.) which allow to categorize the noise value allowing for a modulated adjustment with respect to the determination of the copy number values. For example, in specific embodiments of the method different thresholds may be determined by applying different objective criteria on the mean absolute deviation to 2 or maximum deviation to 2, which then translate to different values of noise measures, ranging, e.g., from less restrictive to more restrictive.

Thereby different specific use groups or categories may be obtained which can be employed to distinguish the potential further treatment of the samples.

In a further aspect the present invention relates to a method for determining a subject's genetic copy number value in massively parallel nucleic acid sequencing data derived from a sample, comprising adjusting the determination of the subject's genetic copy number value by applying a value for the statistical noise level in a subject's genetic copy number as determined in the method for determining the statistical noise level in the calculation of a subject's genetic copy number value, as defined above, or the method of reducing the statistical noise level in the calculation of a subject's genetic copy number value in massively parallel nucleic acid sequencing data derived from a sample, as defined above, to said sample. The determination of the subject's copy number value comprises the steps of calculating a ratio between a subject's (test) sample sequencing read count and a control or normal sample sequencing read count. The calculation is preferably performed according to a suitable scheme as known to the skilled person, or in accordance with suitable literature sources such as Talevich et al., 2016 PLoS Comput Biol, 12 (4):e1004873.

If the noise value calculated according to the methods of the present invention surpasses the threshold obtained according to the procedure of the present invention as defined herein above, preferably surpasses threshold value B (if two threshold values A and B are used) or surpasses threshold value C (if three threshold values A, B and C are used) as defined herein above, the adjustment of the determination of the subject's genetic copy number value comprises an exclusion from further usage of samples which have been identified as being higher than said threshold. The term "exclusion from further usage" as used herein refers to either a full exclusion from copy number calling or an exclusion from calling of copy number deletions.

Alternatively, the adjustment of the determination of the subject's genetic copy number value may comprise or be an elevation of the calling threshold. For example, if a standard approach would lead to the calling of an amplification (diploid) of CN=4 as "significantly amplified", the adjustment according to the present invention if a high noise level is determined may redefine the calling threshold and thus lead to an assignment of "significantly amplified" only if CN=8.

In a similar approach, the adjusting of the determination of the subject's genetic copy number value may comprise a modification of the statistical significance of a calculated genetic copy number subject to the value for the statistical noise level in a subject's genetic copy number as determined in the method of the invention as defined herein to said sample. The statistical significance of a calculated copy number value may be reduced or increased depending on the noise level value obtained in accordance with the method of the present invention.

In a further aspect the present invention relates to a method to determine a subject's genetic copy number value for stratifying the subject for cancer therapy, comprising (a) performing a massively parallel nucleic acid sequencing of nucleic acids extracted from a subject's tumor sample; (b) determining the subject's genetic copy number value according to the methods as described above; and (c) attributing the determined subject's genetic copy number value to a group of increased, normal or decreased copy number values, which can guide a treatment decision. The method is preferably an in vitro method.

The term "stratifying patients" as used herein means that patients are partitioned by a factor other than the treatment itself. This factor, may, in the present case, be copy number value as defined herein above. The stratification may, for example, help to control confounding variables, or to facilitate the detection and interpretation between variables. Typically, the patient may be analyzed with respect to its copy number value. In case a certain copy number value is encountered or suspected, specific therapy forms or specifically adjusted therapy forms may be used.

The stratification may, in particular, be based on the attribution of a determined copy number value to a diagnosis group.

According to the present invention, the subject may, according to the copy number value determined, either have a decreased genetic copy number value, a normal copy number value or an increased copy number value.

In specific embodiments, a decreased genetic copy number value corresponds to a genetic copy number significantly lower than 2. In a further embodiment, a normal copy number value corresponds to a copy number value of 2. In yet another group of embodiments, an increased copy number value corresponds to a copy number which is significantly higher than 2. The term "significantly lower" or "significantly higher" as used herein means for example that the determined copy number (if not a final absolute integer copy number is derived) plus 2 times its standard error is below 1.1, 1.2, 1.3, 1.4, 1.5, 1.6, 1.7, 1.8, 1.9 or 2.0 ("significantly lower") or that the determined copy number minus 2 times its standard error is above 2.0, 2.5, 3.0, 3.5, 4.0, 4.5, 5.0, 5.5, 6.0. In case a final absolute integer copy number is determined, copy numbers 0, 1 may be deleted and copy numbers 3, 4, 5 may be amplified, e.g. with respect to 2 or with respect to mean ploidy.

The attribution to these groups may decide about the perspective or benefit of treatment options. In one embodiment, a decreased or increased genetic copy number value indicates a preference for a targeted cancer therapy. A normal copy number value, on the other hand, indicates a healthy status. A "targeted cancer therapy" as used herein relates to the blocking of the growth of cancer cells by interfering with specific targeted molecules needed for carcinogenesis and tumor growth. Examples of targeted cancer therapeutic approaches include the blocking or turning off of chemical signals instructing the cancer cell to grow and divide, the modification of proteins within the cancer cells so the cells die, the blocking of the angiogenesis, the triggering of the immune system to kill cancer cells, or the transport of toxins to cancer cells to specifically kill said cancer cells.

The term "cancer therapy" as used herein relates to any suitable therapeutic treatment of a cancer disease or a tumor as known to the skilled person. The treatment includes chemotherapy, a treatment with small molecules, an antibody-treatment, an immunotherapy, e.g. a checkpoint inhibitor based immunotherapy or a combination thereof. Also envisaged are additional therapy forms including gene-therapy, antisense-RNA therapy etc. as well as any other suitable type of treatment, including future therapy forms. The skilled person would be aware of the corresponding therapy forms and also the usability of compounds and compositions for specific cancer forms, or can derive this information from suitable literature sources such as Karp and Falchook, Handbook of targeted cancer therapy, 2014. Ed. Lippincott Williams.

The "cancer" form to be treated may be any cancer known to the skilled person, e.g. a cancer form, which can be associated with an elevated or decreased copy numbers. This may, for example, be breast cancer, prostate cancer, ovarian cancer, renal cancer, lung cancer, pancreas cancer, urinary bladder cancer, uterus cancer, kidney cancer, brain cancer, stomach cancer, colon cancer, melanoma or fibrosarcoma, gastrointestinal stromal tumor (GIST), glioblastoma and hematological leukemia and lymphomas, both from the myeloid and lymphatic lineage.

The method to determine a subject's genetic copy number according to the present invention, in particular, envisages the performance of a massively parallel nucleic acid sequencing of nucleic acids. It is preferred to carry out this sequencing as described herein above in detail, or as derivable from any suitable literature source. The nucleic acid, e.g. DNA, to be used for the sequencing may be derived from any suitable sample. It is preferred to extract the nucleic acids from a tumor sample of a patient. Also envisaged is to obtain a non-tumorous control sample, or to make use of previously deposited samples, e.g. samples derived from the umbilical cord.

The sample to be used may preferably be a sample comprising one or more premalignant or malignant cells. It may further be a sample comprising cells from a solid tumor or soft-tissue tumor or a metastatic lesion. Also envisaged is the use of a sample comprising tissue or cells from a surgical margin. Further envisaged is the employment of a histologically normal tissue obtained in a biopsy, e.g. as control. The present invention also relates to the use of one or more circulating tumor cells (CTC), e.g. obtained from blood samples. The sample may also be a sample comprising circulating tumor DNA (ctDNA). Particularly preferred is the use of cell free DNA (cfDNA). Such DNA may, for example, be present in blood samples or processed blood samples, or other liquid samples obtained from a subject. Additionally, a blood, plasma or serum sample from the same subject having a tumor or being at risk of having a tumor may be used. Further, the sample may be a paraffin or FFPE-sample.

In a particularly preferred embodiment, the in vitro method as mentioned above includes a preparation step for nucleic acids, which comprises a hybrid-capture based nucleic acid enrichment for genomic regions of interest, i.e. targeted sequences such as exonic sequences etc. as defined above. The term "hybrid-capture based nucleic acid enrichment" as used herein, means that firstly a library of nucleic acids is provided, which is subsequently contacted with a library, either being in solution or being immobilized on a substrate, which comprises a plurality of baits, e.g. oligonucleotide baits complementary to a gene or genomic region of interest to form a hybridization mixture; and subsequently separating a plurality of bait/nucleic acid hybrids from the mixture, e.g. by binding to an entity allowing for separation. This enriched mixture may subsequently be purified or further processed. The identity, amount, concentration, length, form etc. of the baits may be adjusted in accordance with the intended hybridization result. Thereby, a focusing on a gene or region of interest may be achieved, since only those fragments or nucleic acids are capable of hybridizing which show complementarity to the bait sequence. The present invention envisages further variations and future developments of the above mentioned approach. Further details would be known to the skilled person, or can be derived from suitable literature sources such as Mertens et al., 2011, Brief Funct Genomics, 10(6), 374-386; Frampton et al., 2013, Nature Biotechnology, 31(11), 1023-1031; Gnirke et al., 2009, Nature Biotechnology, 27(2), 182-189 or from Teer et al, 2010, Genome Res, 20(10), 1420-1431.

In a further preferred embodiment, the method as described herein above comprises the additional step of providing a report on the obtained results as to the determination of a subject's copy number value as well as its use for the guidance of a treatment decision. Such a report may be provided in any suitable manner or form, e.g. as electronic file, as electronic file distributed or accessible over the internet, e.g. provided in cloud or deposited on a server, or web-based, e.g. provided on suitable web-site. Alternatively, the report may be provided in paper form. The report may be provided and thus drafted in a corresponding form, to a patient (including information relevant for the patient), a relative or other person associated with the patient (including information relevant for this person), a caregiver (including information relevant for the caregiver), a physician (including information relevant for the physician), an oncologist (including information relevant for the oncologist), or a hospital or clinic (including information relevant for the institution), or third party payors, insurance companies or government offices (including information relevant for these entities). The report may accordingly be redacted, modified, extended or adjusted to the above specified recipient. For example, information relevant for the oncologist, e.g. as to the copy number value, may be omitted in the report for the patient etc.

Among the elements the report may comprise, the present invention envisages one or more of the following:
(i) An output from the method performed, which may include the genetic copy number value determined (this information may be relevant for the oncologist, physician, hospital and possibly also insurance companies).
(ii) Information on the meaning of the determined genetic copy number value. The corresponding information may also comprise information on prognosis of the disease, and/or on potential or suggested therapeutic options. Also included may be a conclusion on the most promising treatment, or a potential therapy plan. The corresponding information may be derived from suitable databases, or literature sources, e.g. by a medical professional. These sources may also be provided in the report.
(iii) Further included may be information on the likely effectiveness of a therapeutic option, or the acceptability of a therapeutic option. Moreover, information on the advisability of applying the therapeutic option to a patient having a certain genetic copy number value identified in the report may be given. The corresponding information may be derived from suitable databases, or literature sources. These sources may also be provided in the report.
(iv) Also included may be information, or a recommendation on the administration of a specific drug or compound, as well as the details on potential administration schemes, administration routes, dosage regimen, treatment regimen etc. This may further be extended to the potential administration of additional drugs, e.g. if this information about a patient is already known, or if a co-administration of drugs is necessary or advisable.

In further embodiments, the present invention also envisages a determination system, which performs any of the herein above defined methods. The system may be implemented on any suitable storage or computer platform, e.g. be cloud-based, internet-based, intra-net based or present on local computer or cellphones etc.

In a further set of claims the present invention envisages to the provision of a data processing apparatus or system comprising means for carrying out any one or more steps of the methods of the present invention as mentioned herein above In further embodiments, the present invention additionally envisages a computer program product, which performs any of the herein above defined methods, or any one or more steps of the methods of the present invention as mentioned herein above.

Also envisaged is the provision of a computer-readable storage medium comprising a computer program product as defined above. The computer-readable storage medium may be connected to a server element, or be present in a cloud structure, or be connected via internet to one or more database structures, or client databases etc.

The following figures are provided for illustrative purposes. It is thus understood that the figures are not to be construed as limiting. The skilled person in the art will clearly be able to envisage further modifications of the principles laid out herein.

The invention claimed is:
1. A method of reducing a statistical noise level in a calculation of a subject's genetic copy number value in massively parallel nucleic acid sequencing data derived from a sample, comprising:
(a) obtaining massively parallel sequencing information of a subject's sample and of a cohort of normal sample for a defined set of genomic loci as nucleic acid sequence reads;
(b) aligning said nucleic acid sequencing reads to a reference sequence;
(c) determining the genetic copy number value using a median normalized ratio of sample read count data and normal read count data as obtained in step (a);
(d) determining the ratio of a standard error value or the ratio of a standard deviation value to the genetic copy number value as determined in step (c) at each locus of said defined set of genomic loci;
(e) adding the ratios as determined in step (d), optionally multiplying each ratio with a weight factor corresponding to the clinical relevance of the locus;
(f) obtaining a value for the statistical noise level in the subject's genetic copy number wherein said value for the statistical noise level is the sum of added ratios as obtained in step (e); and
(g) normalizing the value obtained in step (f) by the size of the defined set of genomic loci or by the sum of all applied weights for the defined set of genomic loci if different weights are applied, wherein said normal sample is selected from a heterogeneous cohort of normal samples, wherein said normal sample yields the lowest final noise measure among all normal samples of said cohort with respect to the subject's sample as analyzed, or wherein said normal sample is a sub-cohort selected from a heterogeneous cohort of normal samples, wherein said sub-cohort comprises those normal samples which yield the 2, 3, 4 or 5 lowest final noise measures among all normal samples of said heterogenous cohort with respect to the subject's sample as analyzed, and wherein a reduced value for the statistical noise level in the subject's genetic copy number is obtained.

2. The method of claim 1, wherein said heterogenous cohort of normal samples comprises samples with coverage levels ranging from at least about 50× to at most about 10000×.

3. The method of claim 1, wherein a value obtained for the statistical noise level in a subject's genetic copy number is considered to indicate a noisy sample if a threshold is surpassed, which threshold is calculated according to a procedure comprising the steps of:

(a) selecting a set of normal samples as a calibration test set, wherein all copy numbers are known to have a value of 2;

(b) selecting a disjunct set of normal samples as a calibration reference set, wherein all copy numbers are known to have a value of 2;

(c) analyzing each normal sample in the calibration test set to determine the copy number value of all loci of said defined set of genomic loci, the copy number standard deviation and the copy number standard error by using the calibration reference set of normal samples of step (b) for normalization;

(d) calculating the noise measure value for each of the calibration test samples, wherein the calculation comprises
  (i) determining the ratio of a standard error value or the ratio of a standard deviation value to the genetic copy number value as determined in step (c) at each locus of said defined set of genomic loci;
  (ii) adding the ratios as determined in step (d)(i), optionally multiplying each ratio with a weight factor corresponding to the clinical relevance of the locus;
  (iii) obtaining a value for the statistical noise level in the subject's genetic copy number wherein said value for the statistical noise level is the sum of added ratios as obtained in step (d)(ii); and
  (iv) normalizing the value obtained in step (d)(iii) by the size of the defined set of genomic loci or by the sum of all applied weights for the defined set of genomic loci if different weights are applied;

(e) calculating a direct noise measure value of the copy number value of step (c) by forming a vector of deviations to a copy number value 2, wherein each component of the vector is the deviation of the copy number value of a single locus as determined in step (c) from the copy number value 2;

(f) calculating a p-norm of the vector obtained in step (e) for values of p=1 and/or p→∞ (maximum norm);

(g) for the case of p=1 said vector is normalized by the size of the defined set of genomic loci to obtain a mean of absolute deviation to copy number 2 for all genetic copy numbers in said defined set of genomic loci;

(h) plotting the noise measure of each calibration test sample against the mean absolute deviation to copy number 2 or maximum deviation to copy number 2 and observing correlations for both plots;

(i) using a significance criterion for a threshold in terms of the mean absolute deviation to 2 or maximum deviation to 2 and determining to which value of noise measure it translates; and (j) applying said threshold to the value for the statistical noise level obtained in claim 1.

4. A method for treating a subject having a deviation in genetic copy number of a targeted sequence in a test sample of the subject, the method comprising:

(a) sequencing with massively parallel sequencing the targeted sequence from the test sample and from a normal sample that has the lowest final noise measure among all normal samples of a heterogeneous cohort of normal samples, wherein the targeted sequence comprises two or more than two defined sets of genomic loci and each genomic locus is represented by a plurality of units, to obtain nucleic acid sequencing reads per unit of the targeted sequence;

(b) aligning said nucleic acid sequencing reads from the test sample and from the normal sample to a reference sequence to obtain test sample read count data and normal sample read count data;

(c) determining a ratio of the test sample read count data to the normal sample read count data per unit of the targeted sequence and obtaining a median of the ratios from the plurality of units;

(d) normalizing the ratios from the plurality of units by the median to obtain a median normalized ratio;

(e) determining genetic copy number value of the plurality of units in the test sample using the median normalized ratio, and obtaining the mean genetic copy number value from all the units for each genomic locus of the defined set of genomic loci of the test sample;

(f) determining the ratio of a standard error value or the ratio of a standard deviation value to the mean genetic copy number value for each genomic locus as determined in step (e) of said defined set of genomic loci;

(g) adding the ratios as determined in step (f), optionally multiplying each ratio with a weight factor corresponding to a clinical relevance of the locus to obtain a preliminary statistical noise level in the genetic copy number;

(h) normalizing the value for the preliminary statistical noise level obtained in step (g) by the number of the genomic loci in the defined set of genomic loci, or by the sum of all applied weights for the defined set of genomic loci if different weights are applied, to obtain a noise measure comprising mean relative standard error (MRSE) or mean coefficient of variation (MCV);

(i) adjusting the genetic copy number value by applying a value for the noise measure in the subject's genetic copy number;

(j) reporting the deviation in the genetic copy number value of the targeted sequence in the test sample at a probability greater than 95% when the noise measure is below about 0.2; and (k) treating the subject having the deviation in genetic copy number of the targeted sequence with targeted cancer therapy.

5. The method of claim 4, wherein said adjusting of the determination of the subject's genetic copy number value comprises an exclusion from further usage of samples which have been identified as being higher than a threshold obtained according to a procedure comprising the steps of:

(i1) selecting a set of normal samples as a calibration test set, wherein all copy numbers are known to have a value of 2;

(i2) selecting a disjunct set of normal samples as a calibration reference set, wherein all copy numbers are known to have a value of 2;

(i3) analyzing each normal sample in the calibration test set to determine the copy number value of all loci of said defined set of genomic loci, the copy number standard deviation and the copy number standard error by using the calibration reference set of normal samples of step (i2) for normalization;

(i4) calculating the noise measure value for each of the calibration test samples, wherein the calculation comprises:

(i) determining the ratio of a standard error value or the ratio of a standard deviation value to the genetic copy number value as determined in step (i3) at each locus of said defined set of genomic loci;

(ii) adding the ratios as determined in step (i4)(i), optionally multiplying each ratio with a weight factor corresponding to the clinical relevance of the locus;

(iii) obtaining a value for the statistical noise level in the subject's genetic copy number wherein said value for the statistical noise level is the sum of added ratios as obtained in step (i4)(ii); and (iv) normalizing the value obtained in step (i4)(iii) by the size of the defined set of genomic loci or by the sum of all applied weights for the defined set of genomic loci if different weights are applied;

(i5) calculating a direct noise measure value of the copy number value of step (i3) by forming a vector of deviations to a copy number value 2, wherein each component of the vector is the deviation of the copy number value of a single locus as determined in step (i3) from the copy number value 2;

(i6) calculating a p-norm of the vector obtained in step (i5) for values of p=1 and/or p→∞ (maximum norm);

(i7) for the case of p=1 said vector is normalized by the size of the defined set of genomic loci to obtain a mean of absolute deviation to copy number 2 for all genetic copy numbers in said defined set of genomic loci;

(i8) plotting the noise measure of each calibration test sample against the mean absolute deviation to copy number 2 or maximum deviation to copy number 2 and observing correlations for both plots; and (i9) using a significance criterion for a threshold in terms of the mean absolute deviation to 2 or maximum deviation to 2 and determining to which value of noise measure it translates.

6. The method of claim 4, wherein said adjusting of the determination of the subject's genetic copy number value comprises a modification of the statistical significance of a calculated genetic copy number subject to the value for the statistical noise level in a subject's genetic copy number, wherein the modification is a reduction or increase of the statistical significance depending on the value of the noise level.

* * * * *